(12) United States Patent
Li et al.

(10) Patent No.: US 12,510,696 B2
(45) Date of Patent: Dec. 30, 2025

(54) OPTICAL MODULE

(71) Applicant: HUAWEI TECHNOLOGIES CO., LTD., Guangdong (CN)

(72) Inventors: Ming Li, Wuhan (CN); Wenzhe Liao, Wuhan (CN); Jun Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1009 days.

(21) Appl. No.: 17/586,851

(22) Filed: Jan. 28, 2022

(65) Prior Publication Data

US 2022/0146718 A1    May 12, 2022

Related U.S. Application Data

(63) Continuation of application No. PCT/CN2020/097277, filed on Jun. 20, 2020.

(30) Foreign Application Priority Data

Jul. 31, 2019    (CN) .......................... 201910703445.9

(51) Int. Cl.
*G02B 5/00*    (2006.01)
*G02B 27/10*    (2006.01)
(Continued)

(52) U.S. Cl.
CPC ......... *G02B 5/005* (2013.01); *G02B 27/1006* (2013.01); *G02B 27/141* (2013.01);
(Continued)

(58) Field of Classification Search
CPC ........ G02B 5/00–32; G02B 27/00–648; H04N 23/00–959; H04M 1/00–82
See application file for complete search history.

(56) References Cited

U.S. PATENT DOCUMENTS

| 2005/0012843 A1 | 1/2005 | Kuwakino et al. |
| 2014/0320707 A1 | 10/2014 | Olson |

(Continued)

FOREIGN PATENT DOCUMENTS

| CN | 1655592 A | 8/2005 |
| CN | 101963766 A | 2/2011 |

(Continued)

OTHER PUBLICATIONS

Partial Supplementary European Search Report issued in European Application No. 20847373.6 dated Jan. 31, 2023.
(Continued)

*Primary Examiner* — Christopher A Lamb, II

(57) ABSTRACT

This application discloses an optical module, including a light passing hole, an optical splitter, an optical imaging apparatus, and an optical apparatus, where light entering from the light passing hole is incident on the optical splitter; the optical splitter is configured to split the incident light into two parts, one part of the light enters the optical imaging apparatus, and the other part of the light enters the optical apparatus; the optical imaging apparatus is configured to collect a first image; and the optical apparatus is configured to collect a second image, or the optical apparatus is configured to implement an optical detection function.

17 Claims, 16 Drawing Sheets

(51) Int. Cl.
*G02B 27/14* (2006.01)
*H04M 1/02* (2006.01)
*H04N 23/16* (2023.01)
*H04N 23/45* (2023.01)
*H04N 23/56* (2023.01)

(52) U.S. Cl.
CPC ............. *H04N 23/16* (2023.01); *H04N 23/45* (2023.01); *H04N 23/56* (2023.01); *H04M 1/0264* (2013.01)

(56) References Cited

U.S. PATENT DOCUMENTS

| | | | |
|---|---|---|---|
| 2014/0320962 A1* | 10/2014 | Ando | G02B 27/646 359/557 |
| 2015/0271406 A1 | 9/2015 | Cerny | |
| 2016/0241764 A1 | 8/2016 | Luo et al. | |
| 2018/0041721 A1* | 2/2018 | Lewkow | G02B 27/141 |
| 2019/0077318 A1 | 3/2019 | Datta Gupta et al. | |
| 2021/0368080 A1* | 11/2021 | Bachar | H04N 23/55 |

FOREIGN PATENT DOCUMENTS

| | | |
|---|---|---|
| CN | 105959525 A | 9/2016 |
| CN | 106254738 A | 12/2016 |
| CN | 106443945 A | 2/2017 |
| CN | 206096729 U | 4/2017 |
| CN | 106772908 A | 5/2017 |
| CN | 107179592 A | 9/2017 |
| CN | 107272149 A | 10/2017 |
| CN | 107392188 A | 11/2017 |
| CN | 208028980 U | 10/2018 |
| CN | 109061864 A | 12/2018 |
| CN | 109068033 A | 12/2018 |
| CN | 109270766 A | 1/2019 |
| CN | 109462722 A | 3/2019 |
| CN | 208782911 U | 4/2019 |
| CN | 109981929 A | 7/2019 |
| WO | 2017029380 A1 | 2/2017 |

OTHER PUBLICATIONS

Extended European Search Report issued in European Application No. 20847373.6 dated Apr. 17, 2023.
International Search Report and Written Opinion issued in PCT/CN2020/097277, dated Oct. 2, 2020, 9 pages.
Office Action issued in CN201910703445.9, dated May 26, 2021, 9 pages.
Office Action issued in CN201910703445.9, dated Nov. 18, 2021, 8 pages.

* cited by examiner

CONT.
FROM

CONT.
FROM

CONT.
FROM
FIG. 15A
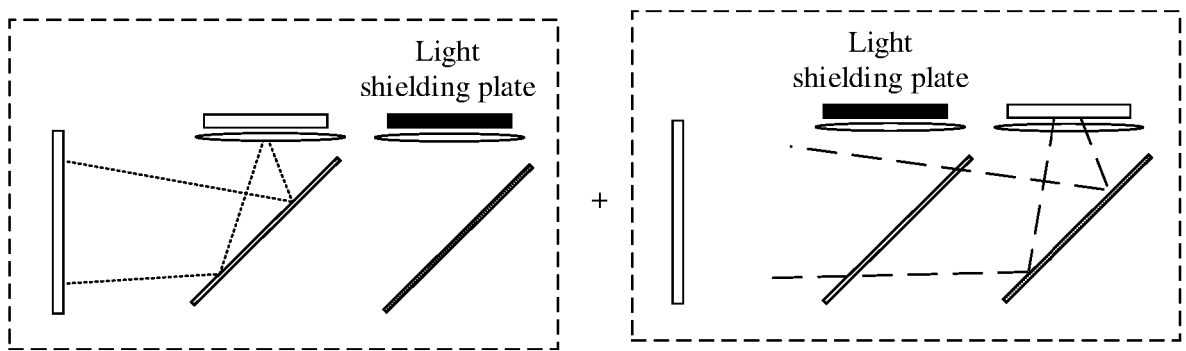
FIG. 15B
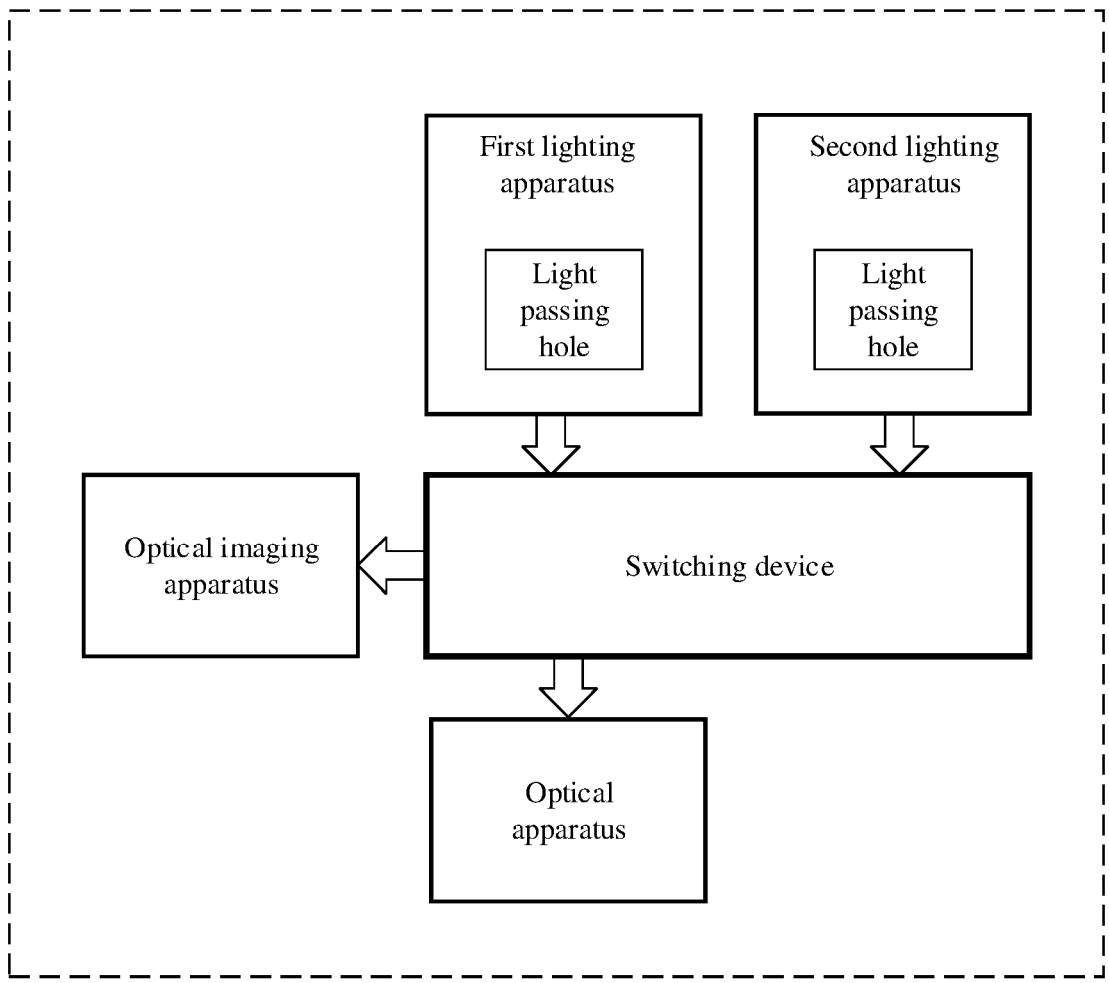
FIG. 16

OPTICAL MODULE

CROSS-REFERENCE TO RELATED APPLICATIONS

This application is a continuation of International Application No. PCT/CN2020/097277, filed on Jun. 20, 2020, which claims priority to Chinese Patent Application No. 201910703445.9, filed on Jul. 31, 2019. The disclosures of the aforementioned applications are hereby incorporated by reference in their entireties.

TECHNICAL FIELD

This application relates to the field of electronic technologies, and in particular, to an optical module.

BACKGROUND

Electronic devices such as mobile phones gradually have become indispensable products in public life. With development of electronic technologies, functions of an electronic device continuously increase, including at least functions such as communication, Internet access, and shooting photographs. Quality of shooting photographs directly affects use experience of the electronic device. Implementation of a photograph shooting function of the electronic device relies on an optical module in hardware to complete image collection, and relies on operation of an algorithm in software, to finally achieve a photographic shooting experience required by a user.

When using the electronic device to shoot photographs, the user sometimes wants to perform wide-angle shooting, and sometimes wants to perform long-focus shooting, so that the user has an increasingly strong requirement on zooming of the optical module, e.g., to vary the magnification of objects and scenes. In a related technology, a zooming technology is completed in a relay manner through a selectable combination of one or a plurality of fixed-focus lenses. During shooting of a photograph, lenses of different focal lengths are used based on different zooming requirements. Each lens module includes a light passing hole or aperture, a lens, and an image sensor. Light is imaged on the image sensor through the lens after entering from the light passing hole. For example, the optical module may include a 0.6-times magnification wide-angle lens, a 1-time magnification main lens, and a 3-times magnification long-focus lens. When 2-times magnification zooming is performed, the 1-time magnification main lens and the 3-times magnification long-focus lens may be invoked to fuse images shot by the two lenses, apertures and image sensors, to obtain an image after 2-times magnification zooming.

However, in the zooming technology, to obtain a larger zooming magnification, a plurality of lens modules are often required for transition. For example, to obtain a zooming magnification greater than or equal to 15 times, a 10-times magnification lens and a 15-times magnification lens are required for transition. Consequently, a quantity of lens modules in the optical module increases rapidly. Because each lens module includes a light passing hole, a lens, and an image sensor, the optical module in this case includes a large quantity of devices, resulting a large volume of the optical module.

SUMMARY

This application provides an optical module, to resolve a problem of a large volume of an optical module in a related technology. Technical solutions are as follows.

According to a first aspect, an optical module is provided. The optical module includes: a light passing hole, an optical splitter, an optical imaging apparatus, and an optical apparatus. Light entering from the light passing hole is incident on the optical splitter; the optical splitter is configured to split the incident light into two parts, one part of the light enters the optical imaging apparatus, and the other part of the light enters the optical apparatus; the optical imaging apparatus is configured to collect a first image; and the optical apparatus is configured to collect a second image, or the optical apparatus is configured to implement an optical detection function.

It should be noted that the optical imaging apparatus and the optical apparatus may be configured to meet different optical requirements. For example, the optical imaging apparatus and the optical apparatus may be configured to meet different image collection requirements; or the optical imaging apparatus may be configured to meet an image collection requirement, and the optical apparatus may be configured to meet an optical detection requirement.

In this embodiment of this application, the optical splitter can split the light entering from the light passing hole into two parts. After one part of the light enters the optical imaging apparatus, the optical imaging apparatus can collect the first image; and after the other part of the light enters the optical apparatus, the optical apparatus can collect the second image or perform optical detection. In this case, a first optical path passes through the light passing hole and the optical imaging apparatus, a second optical path passes through the light passing hole and the optical apparatus, the first optical path and the second optical path meet different optical requirements, and the first optical path and the second optical path share the light passing hole. In this way, the light passing hole is shared by different optical requirements, so that a quantity of devices in the optical module can be effectively reduced, a volume of the optical module can be reduced, overall machine compactness can be improved, a quantity of light passing holes on a housing can be effectively reduced, and appearance beauty can be improved.

In a possible implementation, the optical imaging apparatus includes a first image sensor and a first lens, and the optical apparatus includes a second image sensor and a second lens; and one part of the light that is split by the optical splitter is transmitted to the first image sensor through the first lens, and the other part of the light that is split by the optical splitter is transmitted to the second image sensor through the second lens.

In this embodiment of this application, the optical module can meet different imaging requirements, and implement sharing of the light passing hole when meeting different imaging requirements. In this case, the first image sensor and the second image sensor can use the same light passing hole to simultaneously collect different images. Therefore, when different imaging requirements are met, a quantity of devices in the optical module is effectively reduced, a volume of the optical module is reduced, overall machine compactness is improved, a quantity of light passing holes on a device housing is reduced, and appearance is improved.

In addition, because the first image sensor and the second image sensor can simultaneously collect images, synchronization between the first image sensor and the second image sensor can be ensured when there is external interference such as a jitter, thereby facilitating subsequent processing of the first image collected by the first image sensor and the second image collected by the second image sensor.

In another possible implementation, the optical module further includes a lens, and the light entering from the light passing hole is incident on the optical splitter through the lens; and the optical imaging apparatus includes a color image sensor, and the optical apparatus includes a monochrome image sensor.

In this embodiment of this application, the optical module can meet different imaging requirements, and implement sharing of the light passing hole and the lens when meeting different imaging requirements. In this way, the color image sensor and the monochrome image sensor can use the same light passing hole and the same lens to simultaneously collect a color image and a monochrome image. Therefore, when different imaging requirements are met, a quantity of devices in the optical module is effectively reduced, a volume of the optical module is reduced, overall machine compactness is improved, a quantity of light passing holes on a device housing is reduced, and appearance is improved.

In addition, in this case, because the color image sensor and the monochrome image sensor can simultaneously collect images, synchronization between the color image sensor and the monochrome image sensor can be ensured when there is external interference such as a jitter, thereby facilitating subsequent processing of the color image collected by the color image sensor and the monochrome image collected by the monochrome image sensor.

In still another possible implementation, the optical module further includes a lens, and the light entering from the light passing hole is incident on the optical splitter through the lens; and the optical imaging apparatus includes an image sensor, and the optical apparatus includes a spectrum measurement apparatus.

In this embodiment of this application, the optical module can meet different application requirements, and implement sharing of the light passing hole and the lens when meeting different application requirements. In this way, the image sensor and the spectrum measurement apparatus can use a same light passing hole and a same lens to collect an image and perform spectrum measurement, that is, an image shooting function and a spectrum measurement function can be implemented through a same light passing hole and a same lens. Therefore, when different application requirements are met, a quantity of devices in the optical module is effectively reduced, a volume of the optical module is reduced, overall machine compactness is improved, a quantity of light passing holes on a device housing is reduced, and appearance is improved.

In this case, the optical splitter may include a semi-transparent and semi-reflective mirror. One part of the light entering from the light passing hole may enter the optical imaging apparatus after being reflected by the semi-transparent and semi-reflective mirror, and the other part of the light may enter the optical apparatus through the semi-transparent and semi-reflective mirror. Alternatively, one part of the light entering from the light passing hole may enter the optical imaging apparatus through the semi-transparent and semi-reflective mirror, and the other part of the light may enter the optical apparatus after being reflected by the semi-transparent and semi-reflective mirror.

In a possible implementation, the optical splitter includes a first dichroic mirror, and the first dichroic mirror is configured to reflect visible light and transmit infrared light; and visible light entering from the light passing hole enters the optical imaging apparatus after being reflected by the first dichroic mirror, and infrared light entering from the light passing hole enters the optical apparatus through the first dichroic mirror.

In another possible implementation, the optical splitter includes a second dichroic mirror, and the second dichroic mirror is configured to reflect infrared light and transmit visible light; and visible light entering from the light passing hole enters the optical imaging apparatus through the second dichroic mirror, and infrared light entering from the light passing hole enters the optical apparatus after being reflected by the second dichroic mirror.

In this case, the optical module further includes a lens, and the light entering from the light passing hole is incident on the optical splitter through the lens; and the optical imaging apparatus includes an image sensor, and the optical apparatus includes a time of flight (TOF) element or an infrared sensor.

In this embodiment of this application, the TOF element or the infrared sensor can implement infrared light transceiving through the light passing hole and the lens. In this case, the TOF element or the infrared sensor implements infrared light transceiving through a high-quality optical lens, thereby improving performance of the TOF element or the infrared sensor.

In addition, the optical module can meet different application requirements, and implement sharing of the light passing hole and the lens when meeting different application requirements. In this way, the image sensor and the TOF element can use a same light passing hole and a same lens to collect an image and perform ranging, that is, an image shooting function and a TOF function can be implemented through a same light passing hole and a same lens; or the image sensor and the infrared sensor can use a same light passing hole and a same lens to collect an image and perform infrared photographing, that is, an image shooting function and an infrared photographing function can be implemented through the same light passing hole and the same lens. Therefore, when different application requirements are met, a quantity of devices in the optical module is effectively reduced, a volume of the optical module is reduced, overall machine compactness is improved, a quantity of light passing holes on a device housing is reduced, and appearance is improved.

According to a second aspect, an optical module is provided. The optical module includes: an optical imaging apparatus, a first lighting apparatus, a second lighting apparatus, and a switching device, where the first lighting apparatus and the second lighting apparatus each include a light passing hole. Both a first light beam entering from the light passing hole of the first lighting apparatus and a second light beam entering from the light passing hole of the second lighting apparatus are incident on the switching device; the switching device is configured to switch between a first optical path and a second optical path, where the first optical path is a propagation optical path through which the first light beam enters the optical imaging apparatus through the switching device, and the second optical path is a propagation optical path through which the second light beam enters the optical imaging apparatus through the switching device; and the optical imaging apparatus is configured to collect an image.

It should be noted that the optical imaging apparatus may collect a first image when the first optical path passes through the first lighting apparatus and the optical imaging apparatus, and the optical imaging apparatus may collect a second image when the second optical path passes through the second lighting apparatus and the optical imaging apparatus. The first image may be different from the second image. For example, the first image and the second image may be images of different zooming magnifications.

In this embodiment of this application, the switching device can switch between the first optical path and the second optical path. The optical imaging apparatus can collect the first image when the first optical path passes through the first lighting apparatus and the optical imaging apparatus, and the optical imaging apparatus can collect the second image when the second optical path passes through the second lighting apparatus and the optical imaging apparatus. The first optical path and the second optical path meet different optical requirements, and the first optical path and the second optical path share the optical imaging apparatus. In this way, the optical imaging apparatus is shared by different optical requirements, so that a quantity of devices in the optical module can be effectively reduced, a volume of the optical module can be reduced, and overall machine compactness can be improved.

In a possible implementation, the optical imaging apparatus includes a lens and an image sensor, and the optical module further includes a teleconverter; when the switching device switches to the first optical path, the first light beam enters the lens through the switching device, and is transmitted to the image sensor through the lens; and when the switching device switches to the second optical path, the second light beam enters the lens through the switching device and the teleconverter, and is transmitted to the image sensor through the lens.

In this embodiment of this application, the optical module can switch between different zooming magnifications, and implement sharing of the lens and the image sensor in this case. In this way, when the switching device switches to the first optical path, an image shot by the optical module is an image corresponding to a focal length of the lens in the optical imaging apparatus; and when the switching device switches to the second optical path, an image shot by the optical module is an image corresponding to a focal length of an optical system including the teleconverter and the lens in the optical imaging apparatus. That is, the optical module can shoot images of different zooming magnifications through the same image sensor and the same lens, so that in a multi-time zooming scenario, a volume of the optical module is effectively reduced, and the optical module is more compact.

In another possible implementation, the optical imaging apparatus includes an image sensor, the first lighting apparatus further includes a first lens, and the second lighting apparatus further includes a second lens; and the first light beam is incident on the switching device through the first lens, and the second light beam is incident on the switching device through the second lens.

In this embodiment of this application, the optical module can switch between different zooming magnifications, and implement sharing of the image sensor in this case. In this way, when the switching device switches to the first optical path, an image shot by the optical module is an image corresponding to a focal length of the first lens; and when the switching device switches to the second optical path, an image shot by the optical module is an image corresponding to a focal length of the second lens. That is, the optical module can shoot images of different zooming magnifications by using a same image sensor, so that in a multi-time zooming scenario, a volume of the optical module is effectively reduced, and the optical module is more compact.

In this case, the switching device includes a first reflector and a second reflector; when the first reflector is located between the second reflector and the optical imaging apparatus, the first light beam enters the optical imaging apparatus after being reflected by the first reflector; and when the first reflector is not located between the second reflector and the optical imaging apparatus, the second light beam enters the optical imaging apparatus after being reflected by the second reflector.

Alternatively, the switching device includes a semi-transparent and semi-reflective mirror, a reflector, and a light shielding plate, and the semi-transparent and semi-reflective mirror is located between the reflector and the optical imaging apparatus; when the light shielding plate is located between the light passing hole of the second lighting apparatus and the reflector, the first light beam enters the optical imaging apparatus after being reflected by the semi-transparent and semi-reflective mirror; and when the light shielding plate is located between the light passing hole of the first lighting apparatus and the semi-transparent and semi-reflective mirror, the second light beam enters the optical imaging apparatus through the semi-transparent and semi-reflective mirror after being reflected by the reflector.

The technical solutions provided in this application can bring at least the following beneficial effects:

The optical module includes a light passing hole, an optical splitter, an optical imaging apparatus, and an optical apparatus. Light entering from the light passing hole is incident on the optical splitter. The optical splitter can split the incident light into two parts, one part of the light enters the optical imaging apparatus, and the other part of the light enters the optical apparatus. The optical imaging apparatus can collect a first image. The optical apparatus can collect a second image, or the optical apparatus can implement an optical detection function. In this way, the light passing hole is shared by different optical requirements, so that a quantity of devices in the optical module can be effectively reduced, a volume of the optical module can be reduced, overall machine compactness can be improved, a quantity of light passing holes on a housing can be effectively reduced, and appearance beauty can be improved.

BRIEF DESCRIPTION OF DRAWINGS

FIG. 15A and FIG. 15B are a schematic diagram of a structure of a thirteenth optical module according to an embodiment of this application; and FIG. 16 is a schematic diagram of a structure of a fourteenth optical module according to an embodiment of this application.

DESCRIPTION OF EMBODIMENTS

Figure 1:
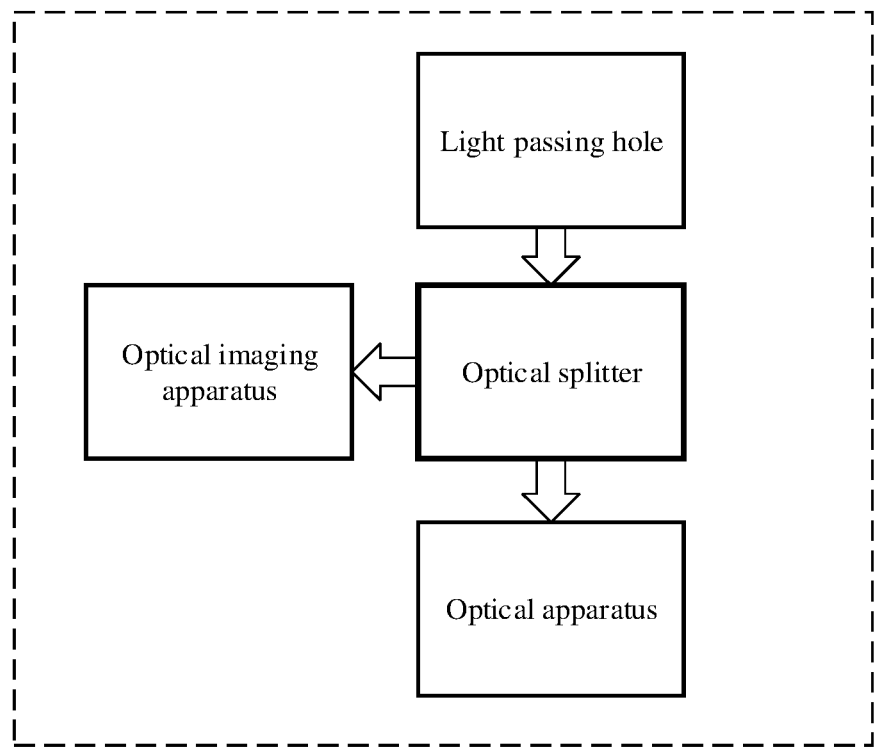
FIG. 1 is a schematic diagram of a structure of a first optical module according to an embodiment of this application.

To make the objectives, technical solutions, and advantages of this application clearer, the following further describes implementations of this application in detail with reference to the accompanying drawings.

Before the embodiments of this application are explained in detail, an application scenario involved in the embodiments of this application is described first.

A digital camera function of an electronic device, for example, a mobile phone refers to shooting a static picture or a dynamic video through a built-in digital camera or an external digital camera. As a new additional function of the electronic device, a shooting capability of the electronic device has become one of the most concerned indexes. Implementation of a shooting function of the electronic device relies on an optical module in hardware to complete image collection, and relies on operation of an algorithm in software, to finally achieve shooting experience required by a user. In addition to an imaging function, a most important technology in an optical module further includes a zooming technology.

A focal length is a measurement manner of measuring aggregation or divergence of light in an optical system, and refers to a distance from a center of a lens to a focal point of light aggregation when parallel light is incident. A shorter focal length indicates a larger angle of view. When the focal length is fixed, a larger image surface indicates a larger angle of view. Generally, a focal length of the optical module is fixed. As the user becomes more dependent on the electronic device, the user sometimes wants to perform wide-angle shooting, and sometimes wants to perform long-focus shooting, so that the user has an increasingly strong requirement on zooming to change the focal length of the optical module. In different scenarios, different lens modules are required to cooperate with each other, and each lens module includes at least devices such as a light passing hole, a lens, and an image sensor, resulting in a large volume of the optical module.

Therefore, embodiments of this application provide an optical module. An optical splitter or a switching device is added to the optical module, to share an optical path or switch between optical paths, so that one or more devices can be shared by some optical functions. For example, when a light passing hole at a front end of a lens module is shared by different optical paths, a plurality of optical requirements may be met through one light passing hole, thereby effectively reducing a quantity of light passing holes on a housing, and improving appearance. When an image sensor at a rear end of the lens module is shared by different optical paths, imaging may be performed by using a same image sensor for different optical requirements. In this way, a quantity of devices in the optical module can be effectively reduced, a volume of the optical module can be reduced, and overall machine compactness can be improved. In addition, compared with a solution in which a plurality of sets of independent optical paths need to be set to implement different optical functions in a related technology, the optical paths of the optical module provided in the embodiments of this application are simpler, packaging and assembling of the optical module are simpler, and costs are lower and yield is higher.

FIG. 1 is a schematic diagram of a structure of an optical module according to an embodiment of this application. Refer to FIG. 1. The optical module includes: a light passing hole, an optical splitter, an optical imaging apparatus, and an optical apparatus.

Light entering from the light passing hole is incident on the optical splitter. The optical splitter is configured to split the incident light into two parts, one part of the light enters the optical imaging apparatus, and the other part of the light enters the optical apparatus. The optical imaging apparatus is configured to collect a first image. The optical apparatus is configured to collect a second image, or the optical apparatus is configured to implement an optical detection function.

It should be noted that the light passing hole is a channel through which light enters, and external light may enter a device from the light passing hole. The optical splitter may be a prism (for example, a dispersive prism), a plane mirror, or the like, and may provide an optical interface. The optical interface may separate light, that is, the optical interface may reflect or transmit light. The light passing hole, the optical imaging apparatus, and the optical apparatus may be distributed in different directions of the optical splitter.

In addition, the first image may be different from the second image. For example, the first image and the second image may be images of different zooming magnifications; or the first image may be a color image, and the second image may be a monochrome image. The optical detection function refers to detecting an object based on optical information. For example, the optical detection function may be a spectrum measurement function, a TOF function, or an infrared photographing function.

In addition, the optical imaging apparatus and the optical apparatus may be configured to meet different optical requirements. For example, the optical imaging apparatus and the optical apparatus may be configured to meet different image collection requirements; or the optical imaging apparatus may be configured to meet an image collection requirement, and the optical apparatus may be configured to meet an optical detection requirement.

When the optical imaging apparatus and the optical apparatus are configured to meet different image collection requirements, a shooting procedure of the optical module may be as follows: when a shooting instruction is issued, simultaneously collecting images through the optical imaging apparatus and the optical apparatus, and fusing two images collected by the optical imaging apparatus and the optical apparatus, to obtain a required image.

In this embodiment of this application, the optical splitter can split the light entering from the light passing hole into two parts. After one part of the light enters the optical imaging apparatus, the optical imaging apparatus can collect the first image; and after the other part of the light enters the optical apparatus, the optical apparatus can collect the second image or perform optical detection. In this case, a first optical path passes through the light passing hole and the optical imaging apparatus, a second optical path passes through the light passing hole and the optical apparatus, the first optical path and the second optical path meet different optical requirements, and the first optical path and the second optical path share the light passing hole. In this way, the light passing hole is shared by different optical requirements, so that a quantity of devices in the optical module can be effectively reduced, a volume of the optical module can be reduced, overall machine compactness can be improved, a quantity of light passing holes on a housing can be effectively reduced, and appearance can be improved.

Figure 2:
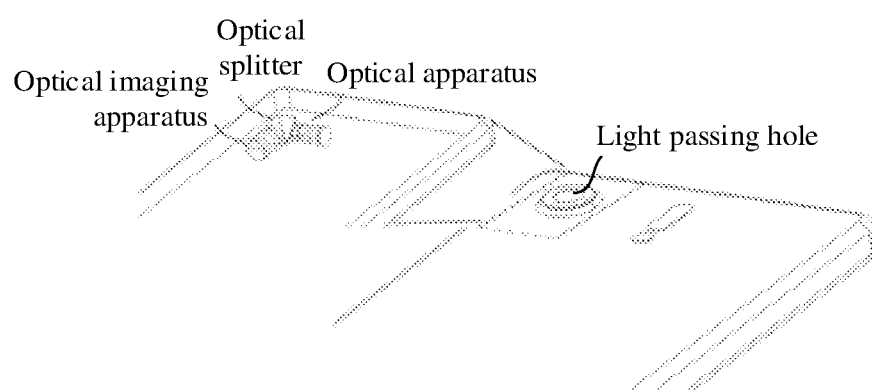
FIG. 2 is a schematic diagram of a device housing according to an embodiment of this application.

In this case, a structure of a device in which the optical module is located may be shown in FIG. 2. A device housing may include a light passing hole, and the optical splitter may be disposed below the light passing hole.

The following describes several possible structures of the optical splitter, the optical imaging apparatus, and the optical apparatus.

Figure 3:
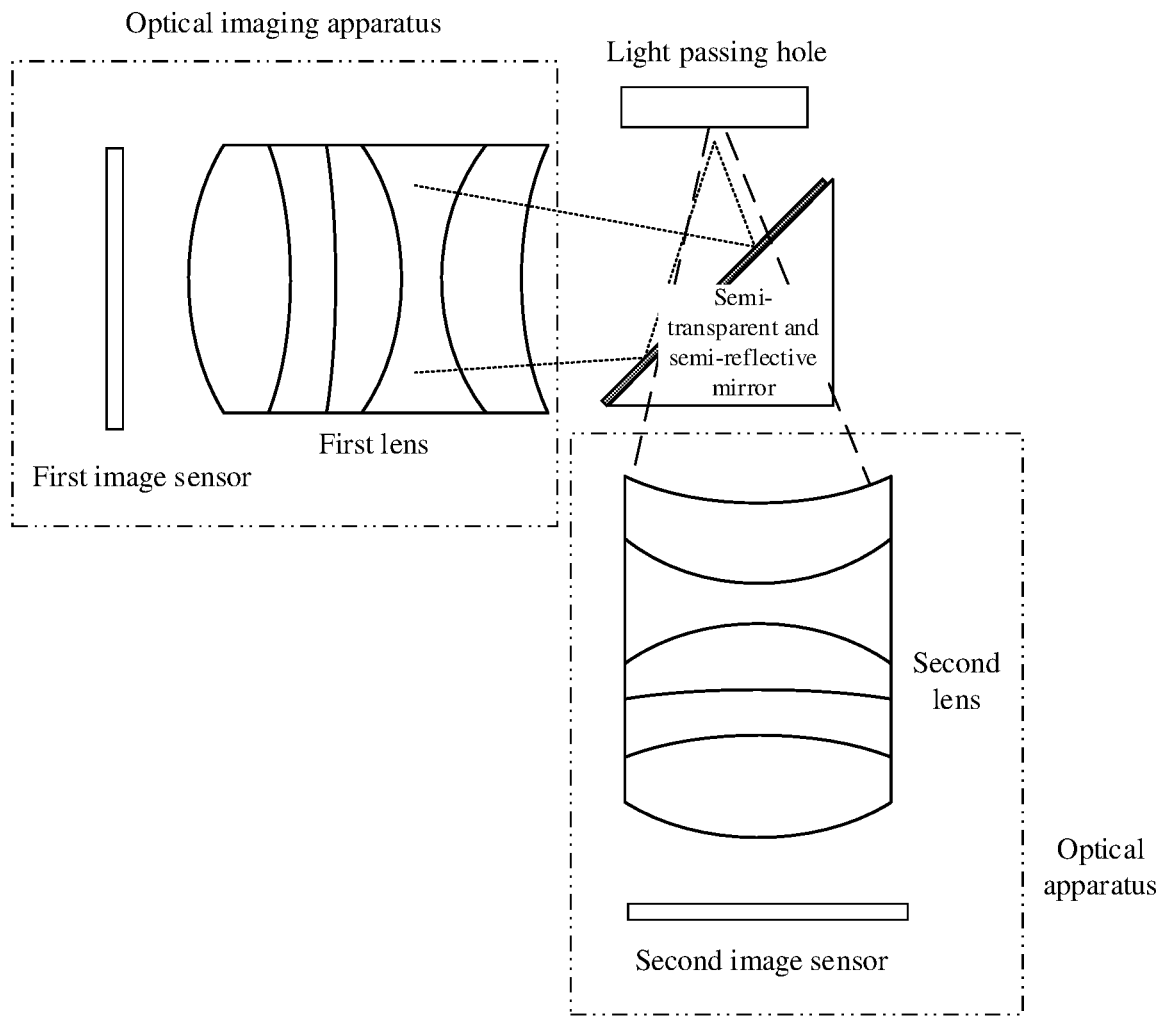
FIG. 3 is a schematic diagram of a structure of a second optical module according to an embodiment of this application.

A first possible structure is as follows: As shown in FIG. 3, the optical imaging apparatus may include a first image sensor and a first lens, and the optical apparatus may include a second image sensor and a second lens. One part of the light that is split by the optical splitter is transmitted to the first image sensor through the first lens, and the other part of the light that is split by the optical splitter is transmitted to the second image sensor through the second lens.

It should be noted that the optical imaging apparatus may collect the first image, that is, when one part of the light that is split by the optical splitter is transmitted to the first image sensor through the first lens, the first image sensor may collect the first image; and the optical apparatus may collect the second image, that is, when the other part of the light that is split by the optical splitter is transmitted to the second image sensor through the second lens, the second image sensor may collect the second image.

In addition, the lens may converge or diverge light to form an image of an object. The lens may be a doublet lens, a triplet lens, or a lens group including a plurality of lenses. The image sensor is a device that converts an optical image into an electrical signal through a photoelectric conversion function of a photoelectric device.

In addition, a focal length of the first lens and a focal length of the second lens may be the same or different, and the first image sensor and the second image sensor may be the same or different.

Optionally, when the focal length of the first lens and the focal length of the second lens are the same, the first image sensor and the second image sensor may be different. For example, the first image sensor may be a color image sensor, and the second image sensor may be a monochrome image sensor. Therefore, based on the conventional color image sensor, the monochrome image sensor is added, to improve an imaging effect. In this case, the first image is a color image, and the second image is a monochrome image.

Optionally, when the focal length of the first lens and the focal length of the second lens are different, the first image sensor and the second image sensor may be the same. In this case, the first image and the second image are images of different zooming magnifications.

When the focal length of the first lens and the focal length of the second lens are different, the first image sensor and the second image sensor may be alternatively different. This is not limited in this embodiment of this application.

In addition, in this case, there may further be another device between the optical splitter and the light passing hole, for example, there may be a lens or a reflection unit configured to reflect light. This is not limited in this embodiment of this application.

In the first possible structure, the optical module can meet different imaging requirements, and implement sharing of the light passing hole when meeting different imaging requirements. In this case, the first image sensor and the second image sensor can use the same light passing hole to simultaneously collect different images. Therefore, when different imaging requirements are met, a quantity of devices in the optical module is effectively reduced, a volume of the optical module is reduced, overall machine compactness is improved, a quantity of light passing holes on a device housing is reduced, and appearance is improved.

In addition, because the first image sensor and the second image sensor can simultaneously collect images, synchronization between the first image sensor and the second image sensor can be ensured when there is external interference such as a jitter, thereby facilitating subsequent processing of the first image collected by the first image sensor and the second image collected by the second image sensor.

For example, in one embodiment, the first image sensor is a color image sensor, and the second image sensor is a monochrome image sensor. Optical design of the first lens and optical design of the second lens may be the same. In this case, two different image sensors may simultaneously collect images. In this way, synchronization between the two image sensors can be ensured under external interference such as a jitter. In this case, a shooting procedure may be as follows: obtaining a shooting instruction; simultaneously collecting images through the monochrome image sensor and the color image sensor; and fusing the images collected by the monochrome image sensor and the color image sensor, to obtain a color image with good picture quality.

Figure 4:
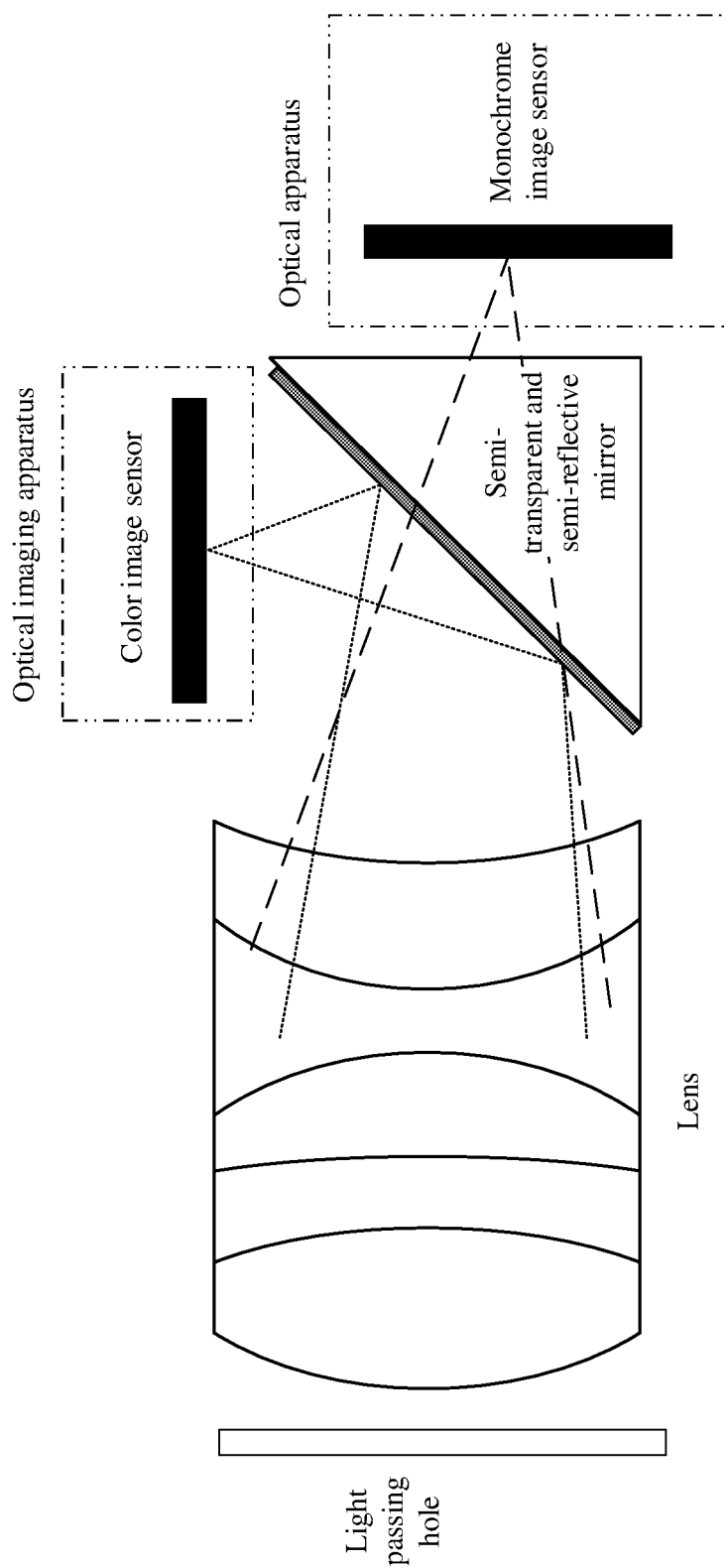
FIG. 4 is a schematic diagram of a structure of a third optical module according to an embodiment of this application.

A second possible structure is as follows: As shown in FIG. 4, the optical module may further include a lens, and the light entering from the light passing hole is incident on the optical splitter through the lens; and the optical imaging apparatus includes a color image sensor, and the optical apparatus includes a monochrome image sensor.

It should be noted that the optical imaging apparatus may collect the first image, that is, when the light entering from the light passing hole is incident on the optical splitter through the lens, one part of the light that is split by the optical splitter may enter the color image sensor, and the color image sensor may collect a color image as the first image; and the optical apparatus may collect the second image, that is, when the light entering from the light passing hole is incident on the optical splitter through the lens, the other part of the light that is split by the optical splitter may enter the monochrome image sensor, and the monochrome image sensor may collect a monochrome image as the second image.

In addition, in this case, there may further be another device between the optical splitter and the light passing hole, for example, there may be a reflection unit configured to reflect light. This is not limited in this embodiment of this application. The optical imaging apparatus and the optical apparatus each may alternatively include another device, for example, a lens. This is not limited in this embodiment of this application.

In the second possible structure, the optical module can meet different imaging requirements, and implement sharing of the light passing hole and the lens when meeting different imaging requirements. In this way, the color image sensor and the monochrome image sensor can use the same light passing hole and the same lens to simultaneously collect the color image and the monochrome image. Therefore, when different imaging requirements are met, a quantity of devices in the optical module is effectively reduced, a volume of the optical module is reduced, overall machine compactness is improved, a quantity of light passing holes on a device housing is reduced, and appearance is improved.

In addition, in this case, because the color image sensor and the monochrome image sensor can simultaneously collect images, synchronization between the color image sensor and the monochrome image sensor can be ensured when there is external interference such as a jitter, thereby facilitating subsequent processing of the color image collected by the color image sensor and the monochrome image collected by the monochrome image sensor.

Figure 5:
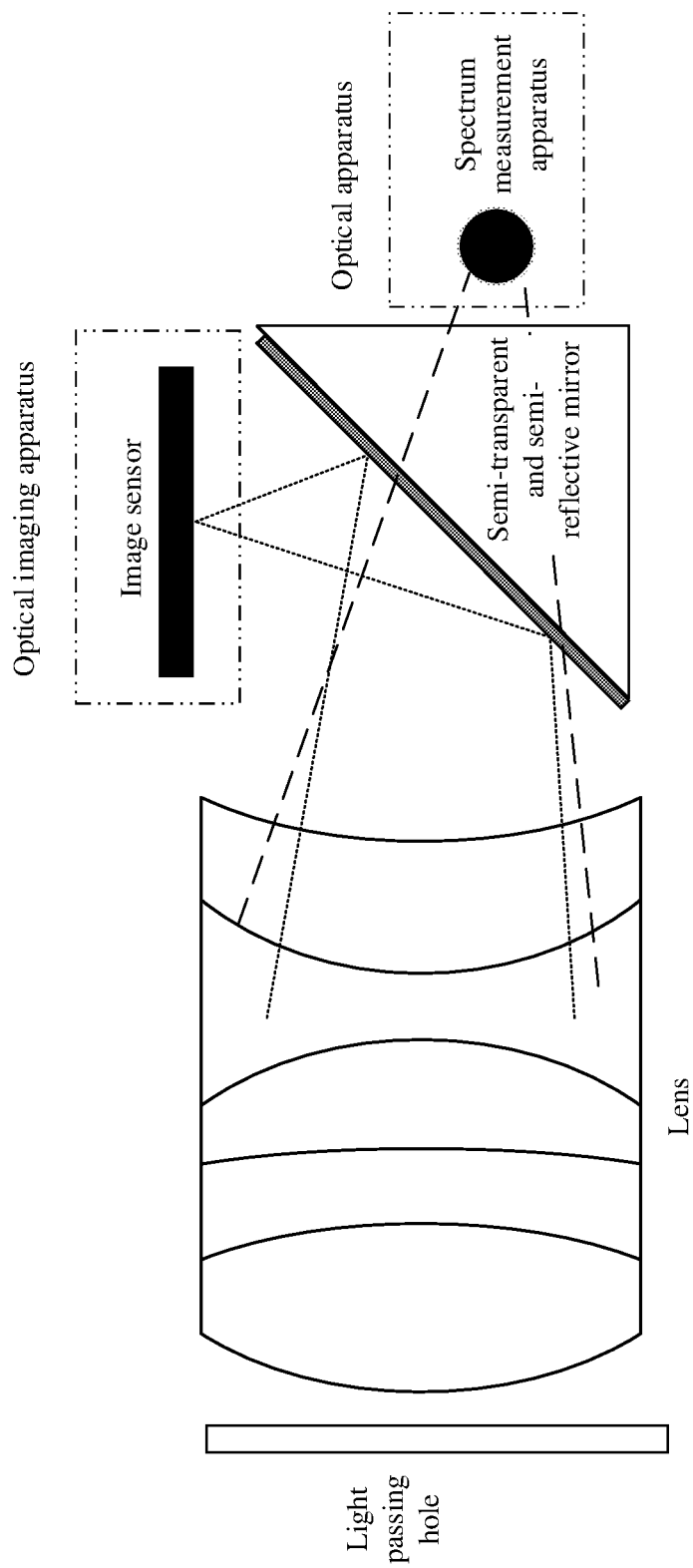
FIG. 5 is a schematic diagram of a structure of a fourth optical module according to an embodiment of this application.

A third possible structure is as follows: As shown in FIG. 5, the optical module may further include a lens, and the light entering from the light passing hole is incident on the optical splitter through the lens; and the optical imaging apparatus includes an image sensor, and the optical apparatus includes a spectrum measurement apparatus.

It should be noted that the optical imaging apparatus may collect the first image, that is, when the light entering from the light passing hole is incident on the optical splitter through the lens, one part of the light that is split by the optical splitter may enter the image sensor, and the image sensor may collect the first image; and the optical apparatus may implement the spectrum measurement function, that is, when the light entering from the light passing hole is incident on the optical splitter through the lens, the other part of the light that is split by the optical splitter may enter the spectrum measurement apparatus, and the spectrum measurement apparatus may determine a property of an object based on a spectrum of light reflected by the object.

In addition, in this case, there may further be another device between the optical splitter and the light passing hole, for example, there may be a reflection unit configured to reflect light. This is not limited in this embodiment of this application. The optical imaging apparatus may alternatively include another device, for example, may include a lens. This is not limited in this embodiment of this application.

In the third possible structure, the optical module can meet different application requirements, and implement sharing of the light passing hole and the lens when meeting different application requirements. In this way, the image sensor and the spectrum measurement apparatus can use a same light passing hole and a same lens to collect an image and perform spectrum measurement, that is, an image shooting function and a spectrum measurement function can be implemented through a same light passing hole and a same lens. Therefore, when different application requirements are met, a quantity of devices in the optical module is effectively reduced, a volume of the optical module is reduced, overall machine compactness is improved, a quantity of light passing holes on a device housing is reduced, and appearance beauty is improved.

Based on the first possible structure, the second possible structure, and the third possible structure, to facilitate the optical splitter to split the incident light into two parts, as shown in FIG. 3 to FIG. 5, the optical splitter may include a semi-transparent and semi-reflective mirror.

It should be noted that the semi-transparent and semi-reflective mirror is configured to perform semi-reflection on light. That is, for light incident on the semi-transparent and semi-reflective mirror, one part of the light may be reflected by the semi-transparent and semi-reflective mirror, and the other part of the light may be transmitted through the semi-transparent and semi-reflective mirror. For example, 70% of the light may be reflected by the semi-transparent and semi-reflective mirror, and 30% of the light may be transmitted through the semi-transparent and semi-reflective mirror.

In this case, one part of the light entering from the light passing hole may enter the optical imaging apparatus after being reflected by the semi-transparent and semi-reflective mirror, and the other part of the light may enter the optical apparatus through the semi-transparent and semi-reflective mirror. Alternatively, one part of the light entering from the light passing hole may enter the optical imaging apparatus through the semi-transparent and semi-reflective mirror, and the other part of the light may enter the optical apparatus after being reflected by the semi-transparent and semi-reflective mirror.

A fourth possible structure is as follows: As shown FIG. 6 or FIG. 7, the optical module may further include a lens, and the light entering from the light passing hole is incident on the optical splitter through the lens; and the optical imaging apparatus includes an image sensor, and the optical apparatus includes a TOF element or an infrared sensor.

It should be noted that the optical imaging apparatus may collect the first image, that is, when the light entering from the light passing hole is incident on the optical splitter through the lens, one part of the light that is split by the optical splitter may enter the image sensor, and the image sensor may collect the first image; and the optical apparatus may implement a TOF function or an infrared photographing function, that is, when the light entering from the light passing hole is incident on the optical splitter through the lens, the other part of the light that is split by the optical splitter may enter the TOF element or the infrared sensor, and the TOF element may measure a distance from an object, and the infrared sensor may collect an infrared image.

In addition, the TOF element may be a component in a TOF system. For example, the TOF element may be a transmit element, a receive element, a transceiver element, or the like in the TOF system. The transmit element may transmit infrared light, the receive element may receive infrared light, or the transceiver element may transmit infrared light and receive infrared light.

In addition, in this case, there may further be another device between the optical splitter and the light passing hole, for example, there may be a reflection unit configured to reflect light. This is not limited in this embodiment of this application. The optical imaging apparatus may alternatively include another device, for example, may include a lens. This is not limited in this embodiment of this application.

In the fourth possible structure, the TOF element or the infrared sensor can implement infrared light transceiving through the light passing hole and the lens. In this case, the TOF element or the infrared sensor implements infrared light transceiving through a high-quality optical lens, thereby improving performance of the TOF element or the infrared sensor.

In addition, the optical module can meet different application requirements, and implement sharing of the light passing hole and the lens when meeting different application requirements. In this way, the image sensor and the TOF element can use the same light passing hole and the same lens to collect an image and perform ranging, that is, an image shooting function and a TOF function can be implemented through the same light passing hole and the same lens; or the image sensor and the infrared sensor can use the same light passing hole and the same lens to collect an image and perform infrared photographing, that is, an image shooting function and an infrared photographing function can be implemented through the same light passing hole and the same lens. Therefore, when different application requirements are met, a quantity of devices in the optical module is effectively reduced, a volume of the optical module is reduced, overall machine compactness is improved, a quantity of light passing holes on a device housing is reduced, and appearance is improved.

Figure 6:
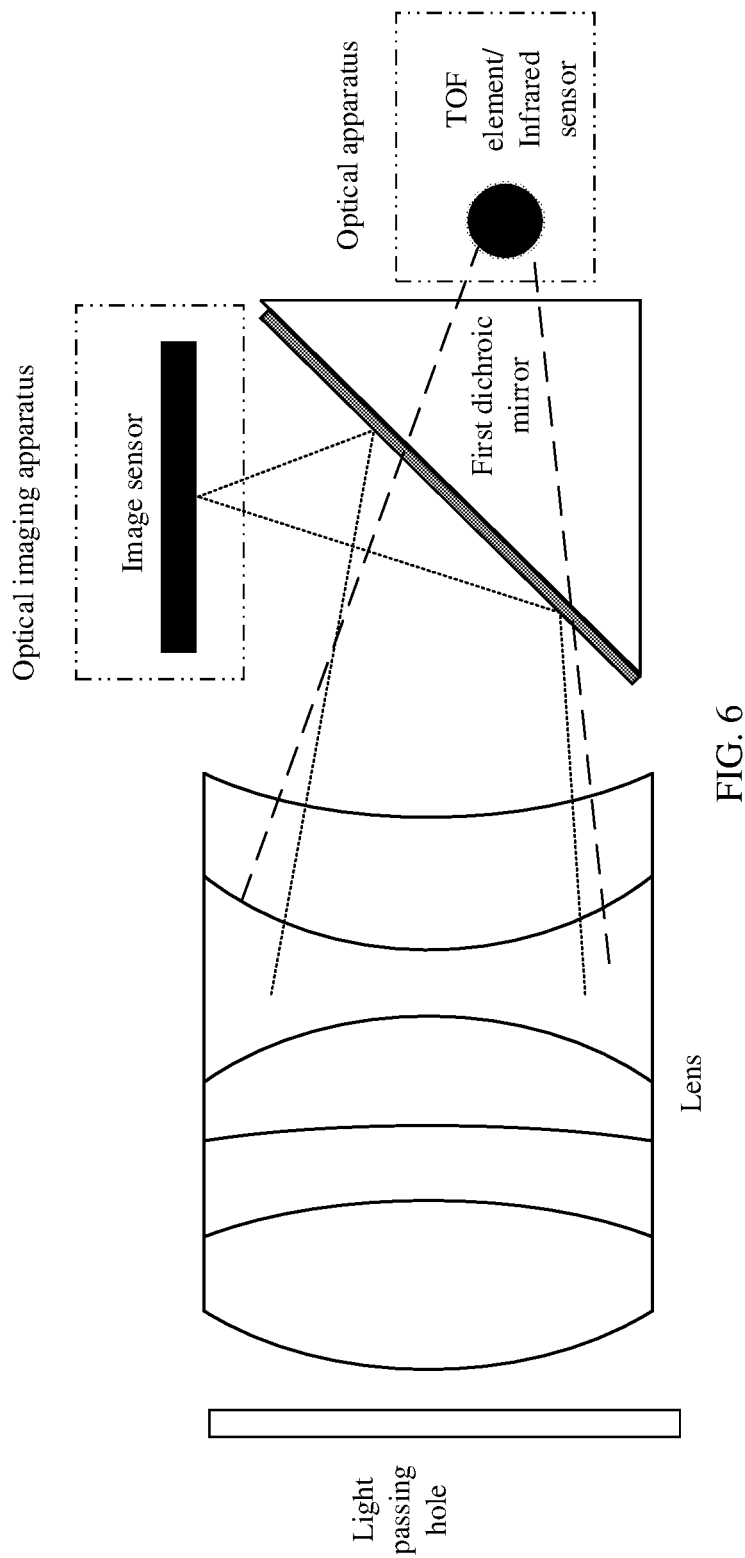
FIG. 6 is a schematic diagram of a structure of a fifth optical module according to an embodiment of this application.
Figure 7:
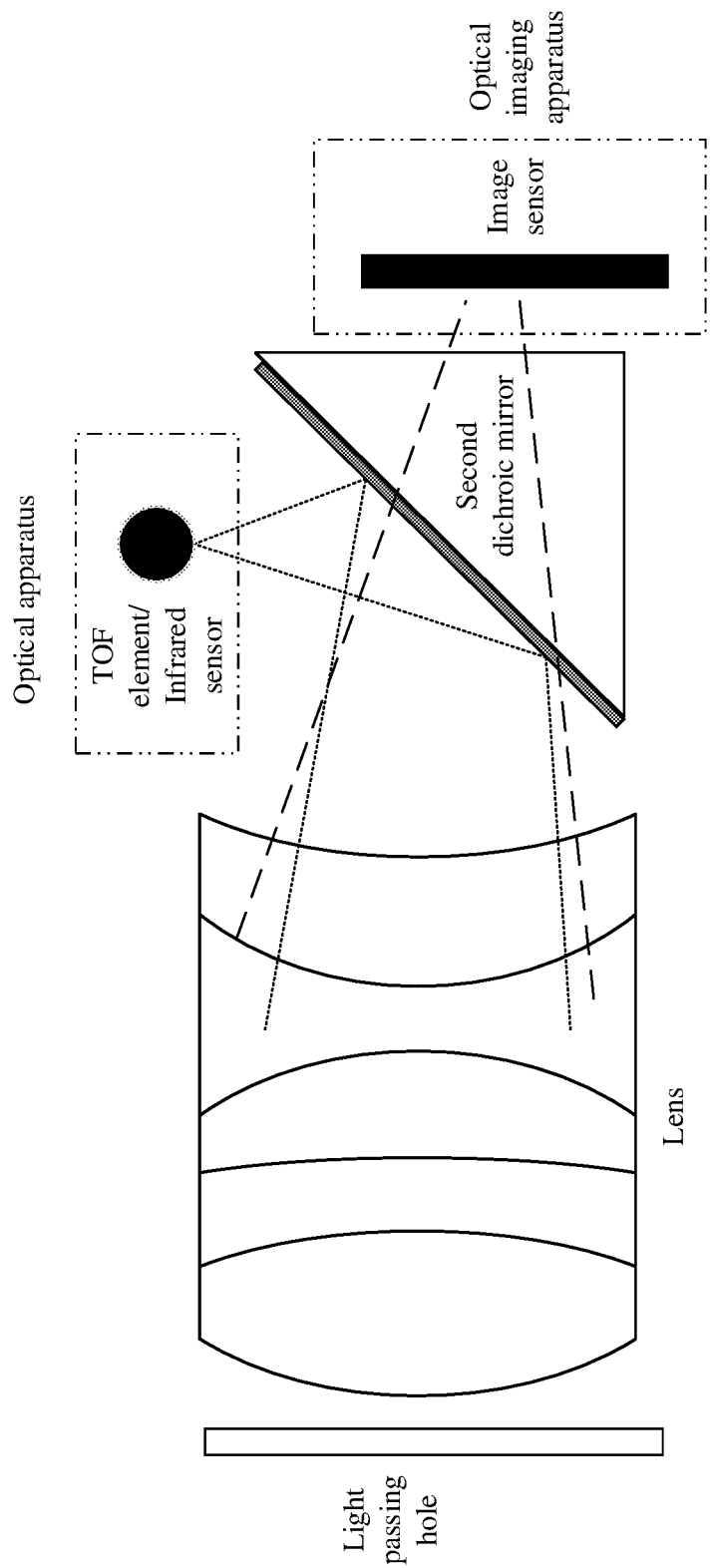
FIG. 7 is a schematic diagram of a structure of a sixth optical module according to an embodiment of this application.

Based on the fourth possible structure, to facilitate the optical splitter to split the incident light into two parts, as shown in FIG. 6, the optical splitter may include a first dichroic mirror, and the first dichroic mirror is configured to reflect visible light and transmit infrared light; and visible light entering from the light passing hole enters the optical imaging apparatus after being reflected by the first dichroic mirror, and infrared light entering from the light passing hole enters the optical apparatus through the first dichroic mirror. Alternatively, as shown in FIG. 7, the optical splitter may include a second dichroic mirror, and the second dichroic mirror is configured to reflect infrared light and transmit visible light; and visible light entering from the light passing hole enters the optical imaging apparatus through the second dichroic mirror, and infrared light entering from the light passing hole enters the optical apparatus after being reflected by the second dichroic mirror.

It should be noted that in this embodiment of this application, the foregoing structures are merely examples for description. In actual application, the optical splitter, the optical imaging apparatus, and the optical apparatus each may be alternatively another structure, provided that one part of the light entering from the light passing hole can enter the optical imaging apparatus under action of the optical splitter, and the other part of the light can enter the optical apparatus under the action of the optical splitter.

It should be noted that the optical splitter may further implement an optical image stabilization function. For example, the semi-transparent and semi-reflective mirror, the dichroic mirror, or the like included in the optical splitter may be rotated in different directions by using a micro-electro-mechanical system (MEMS) technology, so that a spatial location of the optical splitter remains unchanged when a device shakes, thereby forming a compact image stabilization system.

Figure 8:
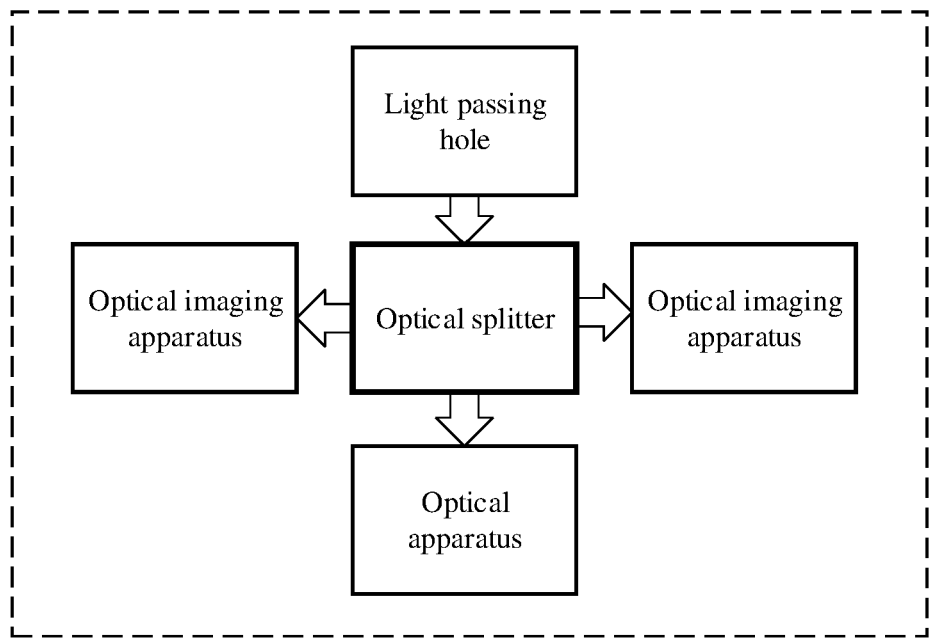
FIG. 8 is a schematic diagram of a structure of a seventh optical module according to an embodiment of this application.

Further, as shown in FIG. 8, the optical module may further include another optical imaging apparatus. In this case, the optical module includes two optical imaging apparatuses. The light entering from the light passing hole is incident on the optical splitter, the optical splitter may split the incident light into two parts, one part of the light enters one of the two optical imaging apparatuses, and the other part of the light enters the optical apparatus.

In this case, the optical splitter may switch between the first optical path and a third optical path, where the first optical path is a propagation optical path through which the light entering from the light passing hole enters one of the two optical imaging apparatuses through the optical splitter, and the third optical path is a propagation optical path through which the light entering from the light passing hole enters the other optical imaging apparatus through the optical splitter.

In this case, the optical splitter may switch between the first optical path and the third optical path by adjusting a location of the optical splitter. For example, when the optical module is the structure shown in FIG. 3, the two optical imaging apparatuses may be respectively disposed on two sides of the semi-transparent and semi-reflective mirror, and locations of the two optical imaging apparatuses are opposite to each other. In this case, switching between the first optical path and the third optical path may be implemented by adjusting a location of a reflection surface of the semi-transparent and semi-reflective mirror. For example, the reflection surface of the semi-transparent and semi-reflective mirror may be adjusted to be opposite to one optical imaging apparatus, then the first optical path passes through the light passing hole and this optical imaging apparatus, and in this case, the semi-transparent and semi-reflective mirror switches to the first optical path; or the reflection surface of the semi-transparent and semi-reflective mirror may be adjusted to be opposite to the other optical imaging apparatus, then the third optical path passes through the light passing hole and the other optical imaging apparatus, and in this case, the semi-transparent and semi-reflective mirror switches to the third optical path.

It should be noted that the two optical imaging apparatuses included in the optical module may be configured to collect first images of different zooming magnifications. For example, the two optical imaging apparatuses each may include a lens and an image sensor, and focal lengths of lenses included in the two optical imaging apparatuses are different.

Figure 9:
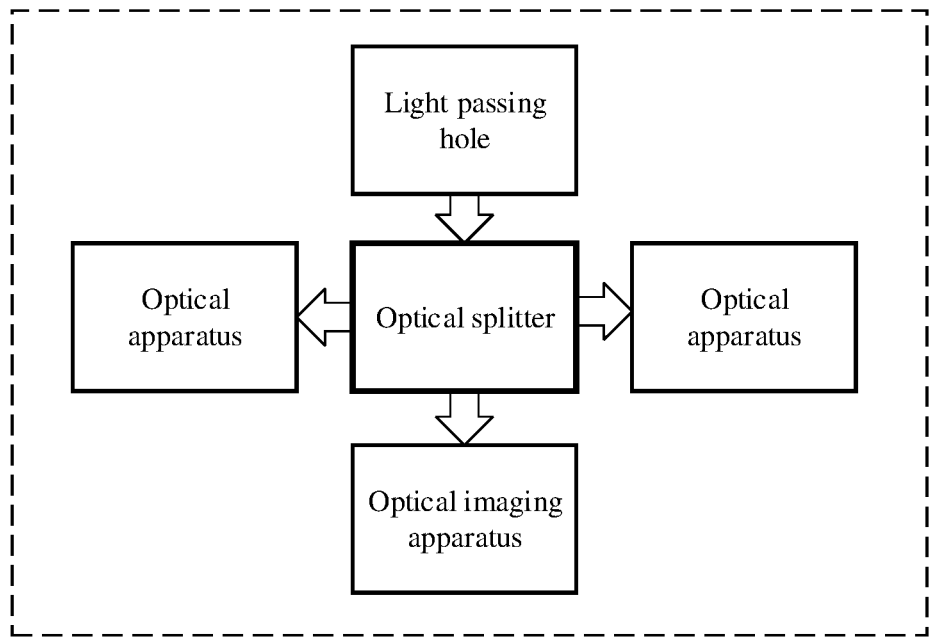
FIG. 9 is a schematic diagram of a structure of an eighth optical module according to an embodiment of this application.

Further, as shown in FIG. 9, the optical module may further include another optical apparatus. In this case, the optical module includes two optical apparatuses. The light entering from the light passing hole is incident on the optical splitter, the optical splitter may split the incident light into two parts, one part of the light entering the optical imaging apparatus, and the other part of the light entering one of the two optical apparatuses.

In this case, the optical splitter may switch between the second optical path and a fourth optical path, where the second optical path is a propagation optical path through which the light entering from the light passing hole enters one of the two optical apparatuses through the optical splitter, and the fourth optical path is a propagation optical path through which the light entering from the light passing hole enters the other optical apparatus through the optical splitter.

In this case, switching between the second optical path and the fourth optical path may be implemented by adjusting the location of the optical splitter. For example, when the optical module is the structure shown in FIG. 7, the two optical apparatuses may be disposed on two sides of the second dichroic mirror, and locations of the two optical apparatuses are opposite to each other. In this case, switching between the second optical path and the fourth optical path may be implemented by adjusting a location of an infrared reflection surface of the second dichroic mirror. For example, the infrared reflection surface of the second dichroic mirror may be adjusted to be opposite to one optical apparatus, then the second optical path passes through the light passing hole and this optical apparatus, and in this case, the second dichroic mirror switches to the second optical path; or the infrared reflection surface of the second dichroic surface may be adjusted to be opposite to the other optical apparatus, then the fourth optical path passes through the light passing hole and the other optical apparatus, and in this case, the second dichroic mirror switches to the fourth optical path.

It should be noted that the two optical apparatuses included in the optical module may be configured to collect second images of different zooming magnifications; the two optical apparatuses are configured to implement different optical detection functions; or one optical apparatus is configured to collect a second image, and the other optical apparatus is configured to implement an optical detection function.

For example, the two optical apparatuses each may include a lens and an image sensor, and focal lengths of lenses included in the two optical apparatuses are different; or one of the two optical apparatuses is configured to implement a spectrum measurement function, and the other optical apparatus is configured to implement a TOF function or an infrared photographing function.

In this embodiment of this application, the optical module includes a light passing hole, an optical splitter, an optical imaging apparatus, and an optical apparatus. Light entering from the light passing hole is incident on the optical splitter. The optical splitter can split the incident light into two parts, one part of the light enters the optical imaging apparatus, and the other part of the light enters the optical apparatus. The optical imaging apparatus can collect a first image. The optical apparatus can collect a second image, or the optical apparatus can implement an optical detection function. In this way, the light passing hole is shared by different optical requirements, so that a quantity of devices in the optical module can be effectively reduced, a volume of the optical module can be reduced, overall machine compactness can be improved, a quantity of light passing holes on a housing can be effectively reduced, and appearance can be improved.

Figure 10:
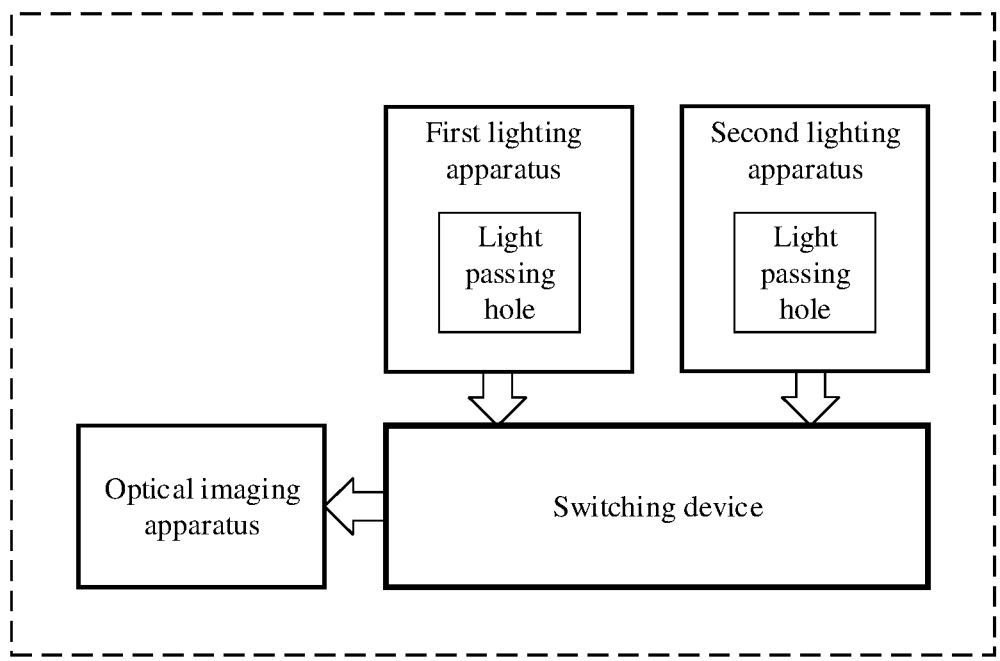
FIG. 10 is a schematic diagram of a structure of a ninth optical module according to an embodiment of this application.

FIG. 10 is a schematic diagram of a structure of a ninth optical module according to an embodiment of this application. Refer to FIG. 10. The optical module includes: an optical imaging apparatus, a first lighting apparatus, a second lighting apparatus, and a switching device, where the first lighting apparatus and the second lighting apparatus each include a light passing hole.

Both a first light beam entering from the light passing hole of the first lighting apparatus and a second light beam entering from the light passing hole of the second lighting apparatus are incident on the switching device. The switching device is configured to switch between a first optical path and a second optical path, where the first optical path is a propagation optical path through which the first light beam enters the optical imaging apparatus through the switching device, and the second optical path is a propagation optical path through which the second light beam enters the optical imaging apparatus through the switching device. The optical imaging apparatus is configured to collect an image.

It should be noted that the light passing hole is a channel through which light enters, and external light may enter a device from the light passing hole.

In addition, the switching device may be a prism (for example, a dispersive prism), a plane mirror, or the like, and may provide an optical interface. The optical interface may reflect or transmit light, and then may implement switching between the first optical path and the second optical path. For example, the switching device may enable the first optical path to pass through the first lighting apparatus and the optical imaging apparatus in a period of time, and may enable the second optical path to pass through the second lighting apparatus and the optical imaging apparatus in another period of time.

In addition, the optical imaging apparatus may collect a first image when the first optical path passes through the first lighting apparatus and the optical imaging apparatus. The optical imaging apparatus may collect a second image when the second optical path passes through the second lighting apparatus and the optical imaging apparatus. The first image may be different from the second image. For example, the first image and the second image may be images of different zooming magnifications.

In this case, a shooting procedure of the optical module may be as follows: when a shooting instruction is issued, first controlling the switching device to switch to the first optical path, and collecting an image by using the optical imaging apparatus; and then controlling the switching device to switch to the second optical path, and collecting an image by using the optical imaging apparatus. Finally, the two images collected by the optical imaging apparatus are fused, to obtain a required image.

In this embodiment of this application, the switching device can switch between the first optical path and the second optical path. The optical imaging apparatus can collect the first image when the first optical path passes through the first lighting apparatus and the optical imaging apparatus, and the optical imaging apparatus can collect the second image when the second optical path passes through the second lighting apparatus and the optical imaging apparatus. The first optical path and the second optical path meet different optical requirements, and the first optical path and the second optical path share the optical imaging apparatus. In this way, the optical imaging apparatus is shared by different optical requirements, so that a quantity of devices in the optical module can be effectively reduced, a volume of the optical module can be reduced, and overall machine compactness can be improved.

Figure 11:
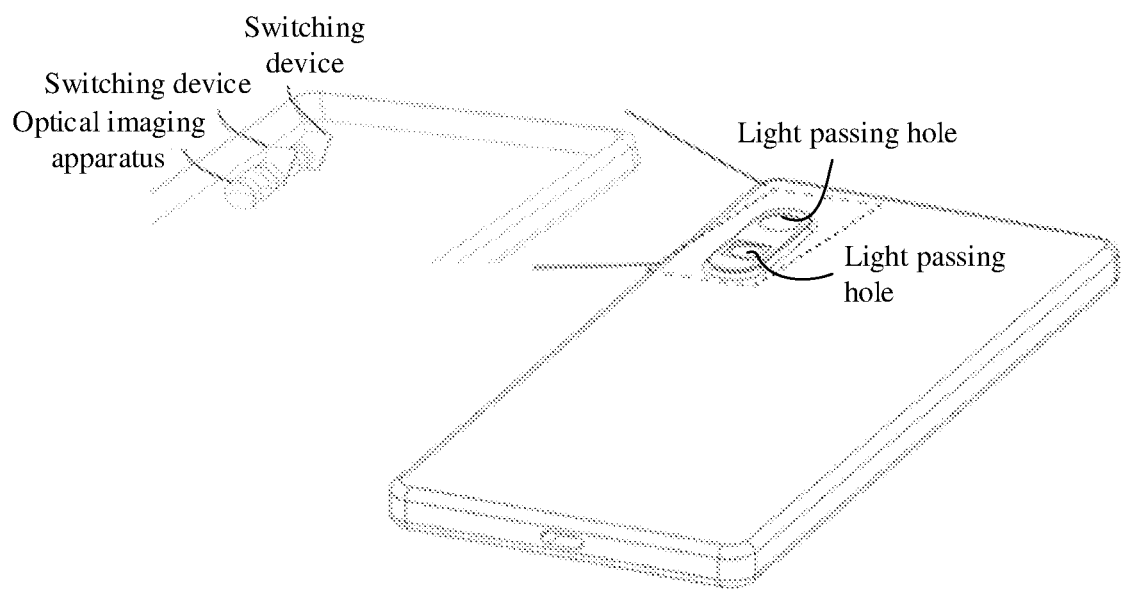
FIG. 11 is a schematic diagram of another device housing according to an embodiment of this application.
Figure 12A:
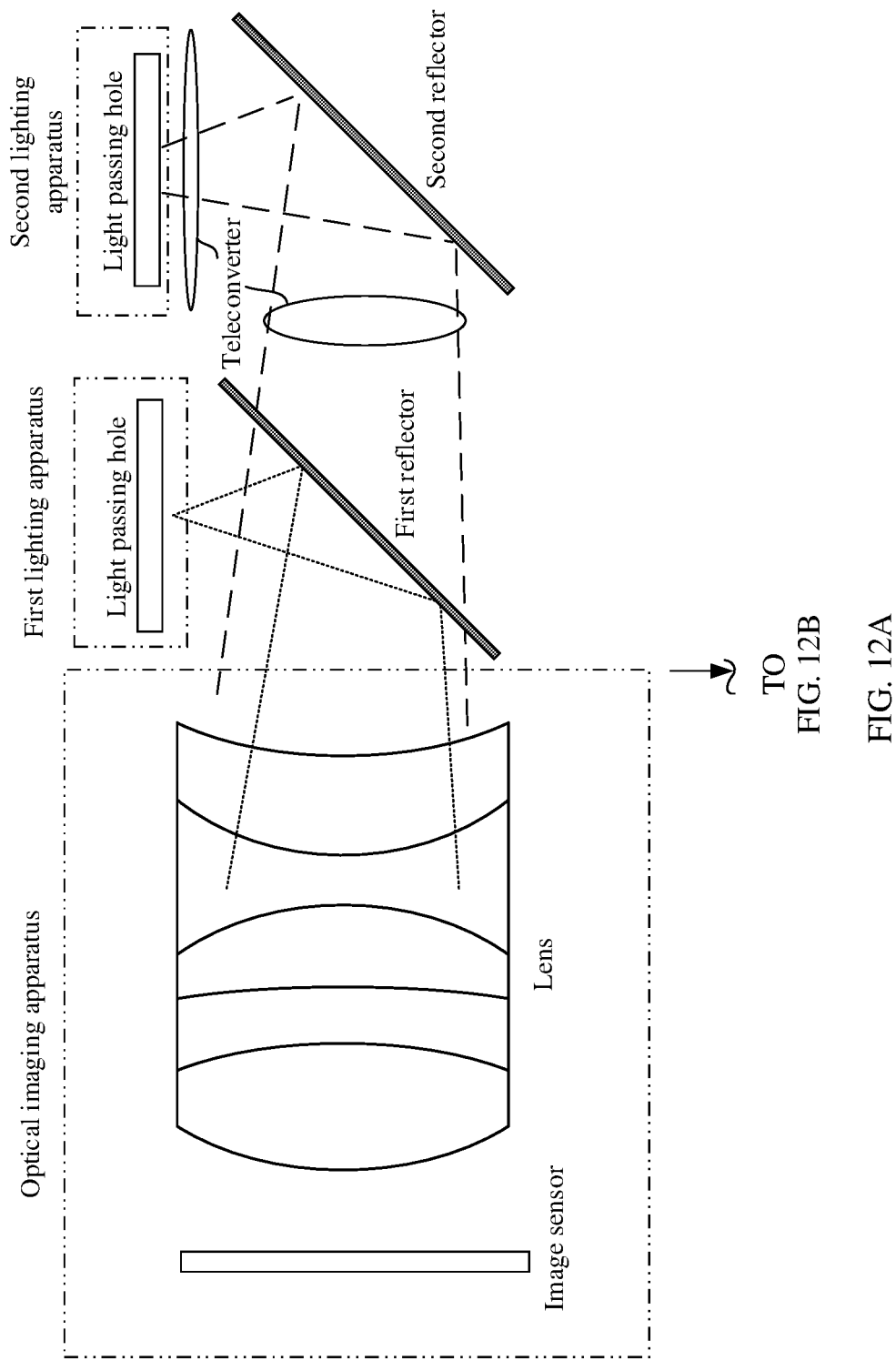
FIG. 12A and FIG. 12B are a schematic diagram of a structure of a tenth optical module according to an embodiment of this application.
Figures 12A, 12B:
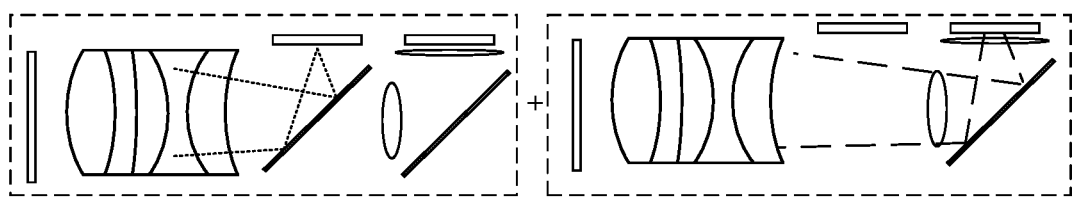
Figure 13A:
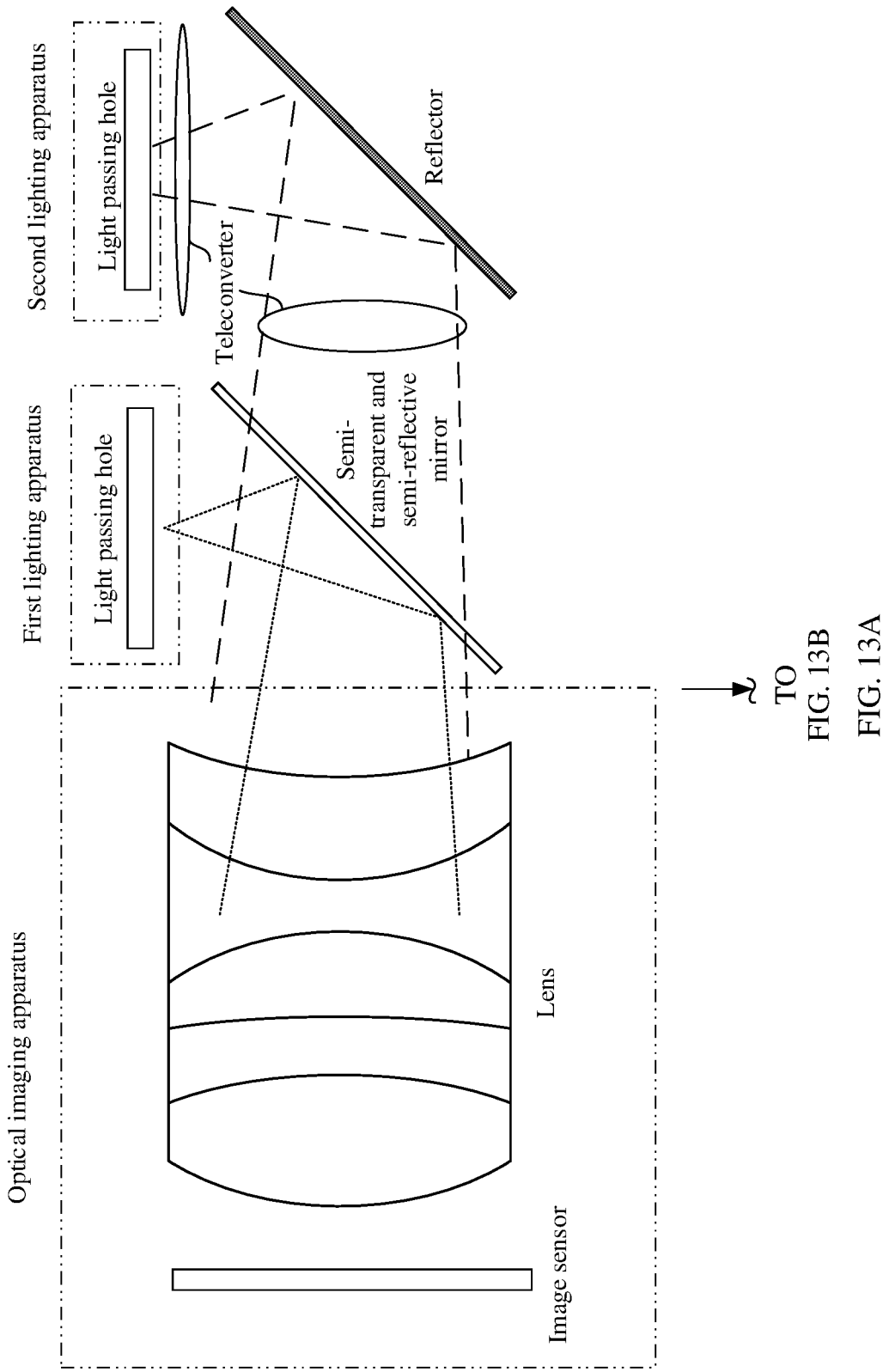
FIG. 13A and FIG. 13B are a schematic diagram of a structure of an eleventh optical module according to an embodiment of this application.
Figures 13A, 13B:
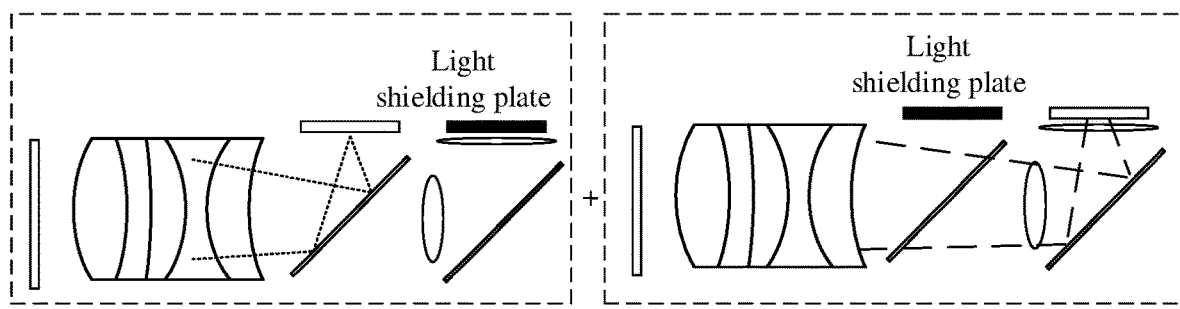
Figure 14A:
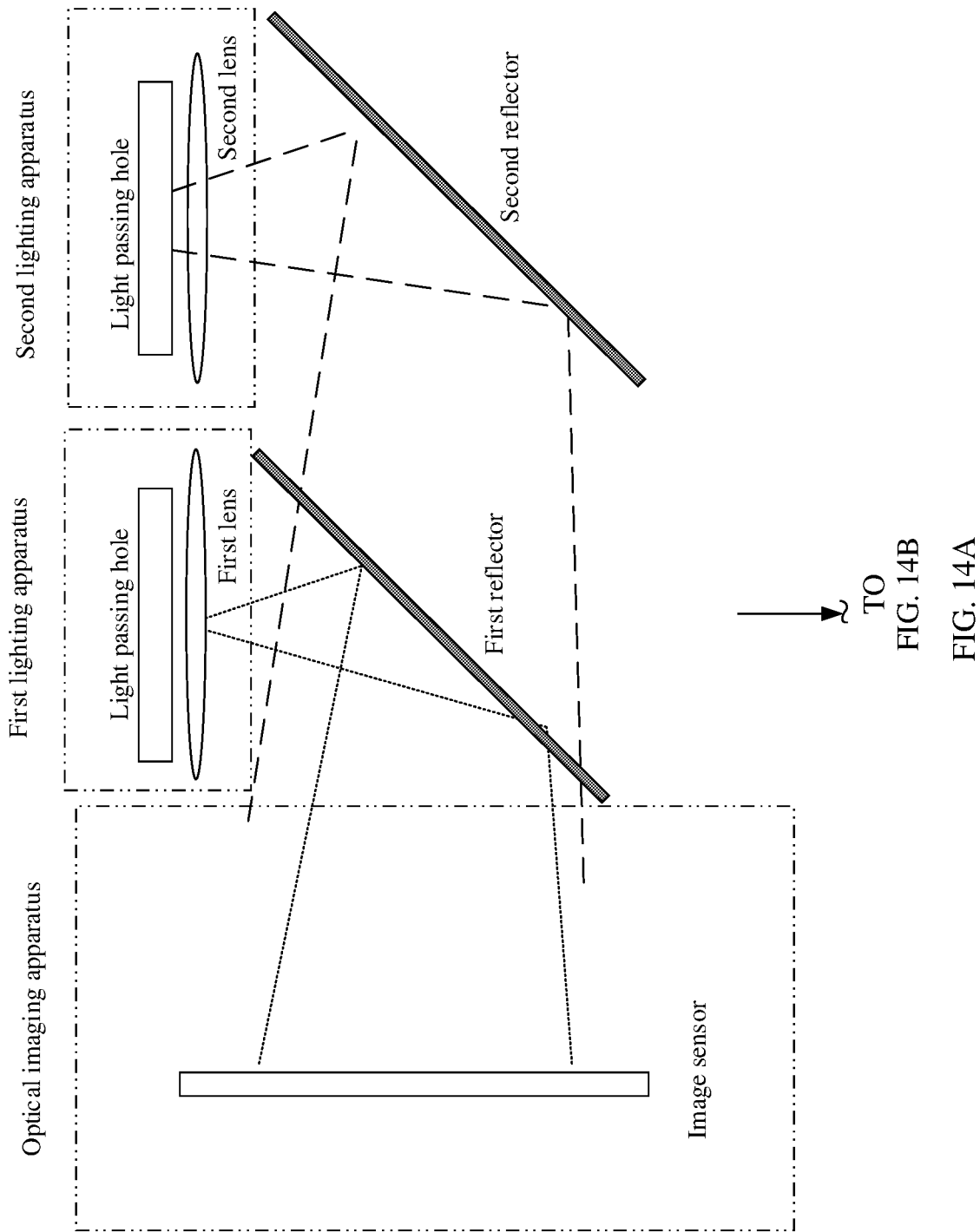
FIG. 14A and FIG. 14B are a schematic diagram of a structure of a twelfth optical module according to an embodiment of this application.
Figure 14B:
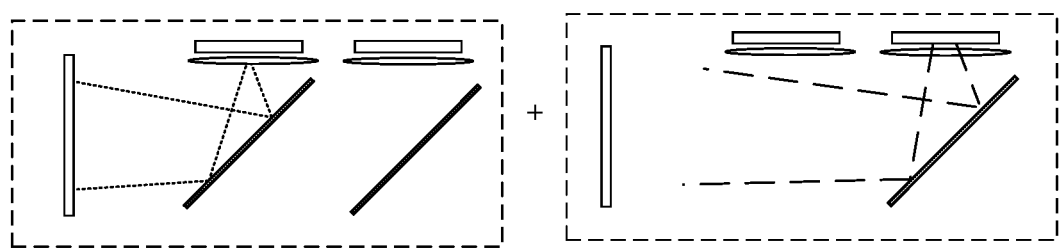
Figure 15A:
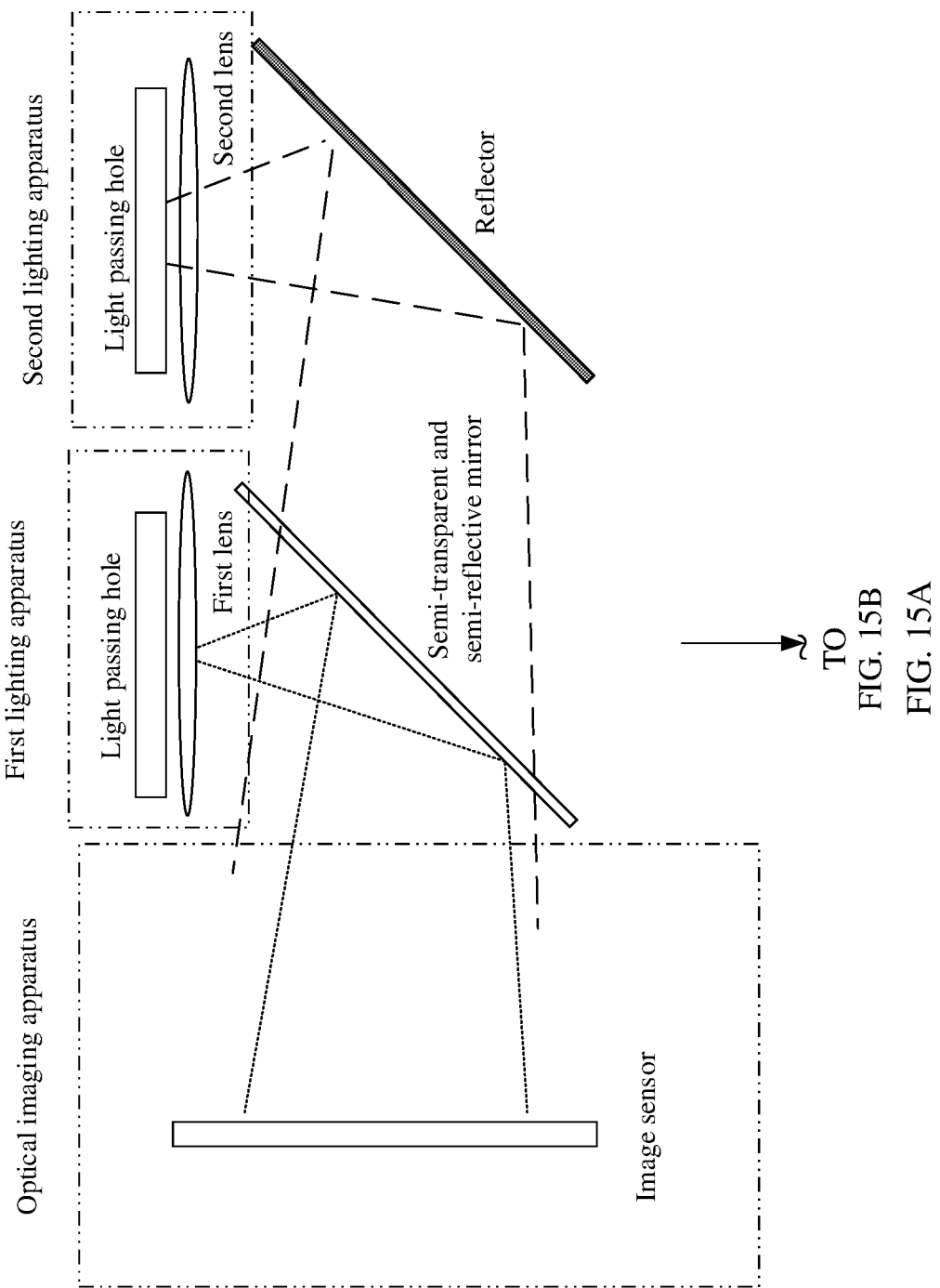

In this case, a structure of a device in which the optical module is located may be shown in FIG. 11. A device housing may include two light passing holes, and the switching device is disposed below the two light passing holes.

The following describes several possible structures of the optical imaging apparatus, the first lighting apparatus, the second lighting apparatus, and the switching device.

A first possible structure is as follows: As shown in FIG. 12A and FIG. 12B or FIG. 13A and FIG. 13B, the optical imaging apparatus may include a lens and an image sensor, and the optical module may further include a teleconverter. When the switching device switches to the first optical path, the first light beam enters the optical imaging apparatus through the switching device, and is transmitted to the image sensor through the lens; and when the switching device switches to the second optical path, the second light beam enters the optical imaging apparatus through the switching device and the teleconverter, and is transmitted to the image sensor through the lens.

It should be noted that the teleconverter is also referred to as a telephoto zoom lens, may zoom in an image, and increase a focal length of an original lens, that is, a focal length of the optical module after the teleconverter is used is greater than a focal length of the optical module when no teleconverter is used. In this embodiment of this application, the teleconverter is disposed in the second optical path. In this case, a focal length corresponding to the first optical path is less than a focal length corresponding to the second optical path.

In addition, when the switching device switches to the first optical path, the first light beam enters the optical imaging apparatus through the switching device, and is transmitted to the image sensor through the lens. Specifically, light transmitted by the switching device is transmitted to the image sensor through the lens.

In addition, the teleconverter may include a plurality of lenses. When the switching device switches to the second optical path, the second light beam enters the optical imaging apparatus through the switching device and the teleconverter. Specifically, the second light beam is incident on the switching device through the teleconverter; the light transmitted by the switching device is transmitted to the optical imaging apparatus through the teleconverter; or the second light beam is incident on the switching device through some lenses in the teleconverter, and the light transmitted by the switching device is transmitted to the optical imaging apparatus through the other lenses in the teleconverter.

In this case, the optical module may switch between different zooming magnifications, and implement sharing of the lens and the image sensor in this case. In this way, when the switching device switches to the first optical path, an image shot by the optical module is an image corresponding to a focal length of the lens in the optical imaging apparatus; and when the switching device switches to the second optical path, an image shot by the optical module is an image corresponding to a focal length of an optical system including the teleconverter and the lens in the optical imaging apparatus. That is, the optical module can shoot images of different zooming magnifications by using a same image sensor and a same lens, so that in a multi-time zooming scenario, a volume of the optical module is effectively reduced, and the optical module is more compact.

For example, when the switching device switches to the first optical path, the focal length of the optical module is the focal length of the lens in the optical imaging apparatus. In this case, it is assumed that a zooming magnification of the optical module is 10 times, and an angle of view is 20°. When the switching device switches to the second optical path, the second optical path includes a 2× teleconverter. The focal length of the optical module is a focal length of an optical system including the teleconverter and the lens in the optical imaging apparatus. In this case, the zooming magnification of the optical module reaches 20 times, an angle of view is 10°, and an equivalent focal length is 247 mm (millimeter). In this way, the first optical path and the second optical path share the lens and the image sensor in the optical imaging apparatus. In this case, 15-times magnification long-focus shooting is used as an example. When a shooting instruction is issued, a 10-times magnification lens is first turned on for image shooting, that is, the switching device is controlled to switch to the first optical path, and an image is collected by using the optical imaging apparatus. Then, optical path switching is implemented by using the switching device, and a 20-times magnification lens is turned on for image shooting, that is, the switching device is controlled to switch to the second optical path, and an image is collected by using the optical imaging apparatus. Finally, the two images collected by the optical imaging apparatus are fused, to obtain an image after 15-times magnification zooming.

A second possible structure is as follows: As shown in FIG. 14A and FIG. 14B or FIG. 15A and FIG. 15B, the optical imaging apparatus may include an image sensor, the first lighting apparatus may further include a first lens, and the second lighting apparatus may further include a second lens. The first light beam is incident on the switching device through the first lens, and the second light beam is incident on the switching device through the second lens.

It should be noted that a focal length of the first lens may be different from a focal length of the second lens. In this case, the focal length corresponding to the first optical path is different from the focal length corresponding to the second optical path.

In this case, the optical module may switch between different zooming magnifications, and implement sharing of the image sensor in this case. In this way, when the switching device switches to the first optical path, an image shot by the optical module is an image corresponding to the focal length of the first lens; and when the switching device switches to the second optical path, an image shot by the optical module is an image corresponding to the focal length of the second lens. That is, the optical module can shoot images of different zooming magnifications by using a same image sensor, so that in a multi-time zooming scenario, a volume of the optical module is effectively reduced, and the optical module is more compact.

Based on the first possible structure and the second possible structure, to facilitate the switching device to switch between the first optical path and the second optical path, as shown in FIG. 12A and FIG. 12B or FIG. 14A and FIG. 14B, the switching device may include a first reflector and a second reflector; or as shown in FIG. 13A and FIG. 13B or FIG. 15A and FIG. 15B, the switching device may include a semi-transparent and semi-reflective mirror, a reflector, and a light shielding plate, where the semi-transparent and semi-reflective mirror is located between the reflector and the optical imaging apparatus.

It should be noted that both the first reflector and the second reflector are configured to perform total reflection on light. Whether the first reflector is located between the second reflector and the optical imaging apparatus may be implemented by adjusting a location of the first reflector. For example, the first reflector may be controlled to be inserted or disposed between the second reflector and the optical imaging apparatus through a driving apparatus, so that the first reflector is located between the second reflector and the optical imaging apparatus; or the first reflector may be controlled to be not inserted or to be put down between the second reflector and the optical imaging apparatus through a driving apparatus, so that the first reflector is not located between the second reflector and the optical imaging apparatus.

In addition, when the first reflector is located between the second reflector and the optical imaging apparatus, the first reflector may reflect the first light beam entering from the light passing hole of the first lighting apparatus, and may reflect the second light beam reflected by the second reflector. The second reflector may reflect the second light beam entering from the light passing hole of the second lighting apparatus. When the first reflector is not located between the second reflector and the optical imaging apparatus, the first reflector does not reflect the first light beam entering from the light passing hole of the first lighting apparatus, and does not reflect the second light beam reflected by the second reflector. The second reflector may reflect the second light beam entering from the light passing hole of the second lighting apparatus.

When the first reflector is located between the second reflector and the optical imaging apparatus, the first light beam entering from the light passing hole of the first lighting apparatus enters the optical imaging apparatus after being reflected by the first reflector. That is, the switching device switches to the first optical path. In this case, the second light beam entering from the light passing hole of the second lighting apparatus is reflected by the second reflector to the first reflector, is reflected by the first reflector to another space, and does not enter the optical imaging apparatus.

When the first reflector is not located between the second reflector and the optical imaging apparatus, the second light beam entering from the light passing hole of the second lighting apparatus enters the optical imaging apparatus after being reflected by the second reflector. That is, the switching device switches to the second optical path. In this case, because the first light beam entering from the light passing hole of the first lighting apparatus is not reflected by the first reflector, the first light beam is transmitted to another space, and does not enter the optical imaging apparatus.

It should be noted that the semi-transparent and semi-reflective mirror is configured to perform semi-reflection on light, that is, for light irradiated on the semi-transparent and semi-reflective mirror, one part of the light may be reflected by the semi-transparent and semi-reflective mirror, and the other part of the light may be transmitted through the semi-transparent and semi-reflective mirror. For example, 70% of the light may be reflected by the semi-transparent and semi-reflective mirror, and 30% of the light may be transmitted through the semi-transparent and semi-reflective mirror. The reflector is configured to perform total reflection on light.

In addition, the light shielding plate is configured to shield light. When the light shielding plate is located between the light passing hole of the first lighting apparatus and the semi-transparent and semi-reflective mirror, the first light beam cannot be incident on the semi-transparent and semi-reflective mirror. When the light shielding plate is located between the light passing hole of the second lighting apparatus and the reflector, the second light beam cannot be incident on the reflector.

When the light shielding plate is located between the light passing hole of the second lighting apparatus and the reflector, the first light beam entering from the light passing hole of the first lighting apparatus enters the optical imaging apparatus after being reflected by the semi-transparent and semi-reflective mirror. That is, the switching device switches to the first optical path. In this case, because the light shielding plate is located between the light passing hole of the second lighting apparatus and the reflector, the second light beam cannot be incident on the reflector, and cannot enter the optical imaging apparatus.

When the light shielding plate is located between the light passing hole of the first lighting apparatus and the semi-transparent and semi-reflective mirror, the second light beam entering from the light passing hole of the second lighting apparatus enters the optical imaging apparatus through the semi-transparent and semi-reflective mirror after being reflected by the reflector. That is, the switching device switches to the second optical path. In this case, because the light shielding plate is located between the light passing hole of the first lighting apparatus and the semi-transparent and semi-reflective mirror, the first light beam cannot be incident on the semi-transparent and semi-reflective mirror, and cannot enter the optical imaging apparatus.

It should be noted that in this embodiment of this application, the foregoing structures are merely examples for description. In actual application, the optical imaging apparatus, the first lighting apparatus, the second lighting apparatus, and the switching device each may be alternatively another structure, provided that the switching device can switch between the first optical path and the second optical path.

It should be noted that the switching device may further implement an optical image stabilization function. For example, the semi-transparent and semi-reflective mirror, the reflector, or the like included in the switching device may be rotated in different directions by using a MEMS technology, so that a spatial location of the switching device remains unchanged when a device shakes, thereby forming a compact image stabilization system.

Further, as shown in FIG. 16, the optical module may further include an optical apparatus. After the first light beam entering from the light passing hole of the first lighting apparatus is incident on the switching device, the switching device may split the first light beam into two parts, one part of the first light beam enters the optical imaging apparatus, and the other part of the first light beam enters the optical apparatus. The optical apparatus is configured to collect an image, or the optical apparatus is configured to implement an optical detection function. The optical detection function refers to detecting an object based on optical information. For example, the optical detection function may be a spectrum measurement function, a TOF function, or an infrared photographing function.

It should be noted that the optical imaging apparatus and the optical apparatus may be configured to meet different optical requirements. For example, the optical imaging apparatus and the optical apparatus may be configured to meet different image collection requirements. For example, the optical imaging apparatus and the optical apparatus may be configured to collect images of different zooming magnifications; the optical imaging apparatus may be configured to collect a color image, and the optical apparatus may be configured to collect a monochrome image; or the optical imaging apparatus may be configured to meet an image collection requirement, and the optical apparatus may be configured to meet an optical detection requirement.

In this case, a structure including the first lighting apparatus, the switching device, the optical imaging apparatus, and the optical apparatus is similar to the optical module described in the foregoing embodiment of FIG. 1. Details are not described in this embodiment of this application again.

Further, the optical module may further include another lighting apparatus. In this case, the optical module includes three lighting apparatuses. In this case, all light beams entering from light passing holes of the three lighting apparatuses are incident on the switching device. The switching device may switch among three optical paths. The three optical paths are respectively propagation optical paths through which the light beams entering from the light passing holes of the three lighting apparatuses enter the optical imaging apparatus through the switching device. A structure of the three lighting apparatuses and the switching device is similar to a structure of the first lighting apparatus, the second lighting apparatus, and the switching device. Details are not described in this embodiment of this application again.

In this embodiment of this application, the optical module includes an optical imaging apparatus, a first lighting apparatus, a second lighting apparatus, and a switching device, where the first lighting apparatus and the second lighting apparatus each include a light passing hole. Both a first light beam entering from the light passing hole of the first lighting apparatus and a second light beam entering from the light passing hole of the second lighting apparatus are incident on the switching device. The switching device is configured to switch between a first optical path and a second optical path, where the first optical path is a propagation optical path through which the first light beam enters the optical imaging apparatus through the switching device, and the second optical path is a propagation optical path through which the second light beam enters the optical imaging apparatus through the switching device. The optical imaging apparatus is configured to collect an image. In this way, the optical imaging apparatus is shared by different optical requirements, so that a quantity of devices in the optical module can be effectively reduced, a volume of the optical module can be reduced, and overall machine compactness can be improved.

The foregoing descriptions are merely embodiments of this application, but are not intended to limit this application. Any modification, equivalent replacement, or improvement made without departing from the spirit and principle of this application should fall within the protection scope of this application.

What is claimed is:

1. An optical module comprising:
   structure defining a light passing hole,
   an optical splitter optically coupled to the light passing hole whereby light entering from the light passing hole is incident on the optical splitter;
   the optical splitter being configured to split the incident light into first and second parts, the first part of the light being optically coupled to an optical imaging apparatus comprising a first image sensor and a first lens, and the second part of the light being optically coupled to an optical apparatus comprising a second image sensor and a second lens, a focal length of the first lens is same with a focal length of the second lens, wherein the first part of the light that is split by the optical splitter is transmitted to the first image sensor through the first lens, and the second part of the light that is split by the optical splitter is transmitted to the second image sensor through the second lens, the first image sensor being different from the second image sensor;
   the optical imaging apparatus being configured to collect a first image; and
   the optical apparatus being configured to obtain a second image, and/or the optical apparatus being configured to implement an optical detection function.

2. The optical module according to claim 1, further comprising a lens, the light entering from the light passing hole is incident on the optical splitter passing through the lens;
   wherein the optical imaging apparatus comprises a color image sensor, and the optical apparatus comprises a monochrome image sensor.

3. The optical module according to claim 1, further comprising a lens, the light entering from the light passing hole that is incident on the optical splitter passing through the lens; and
   wherein the optical imaging apparatus comprises an image sensor, and the optical apparatus comprises a spectrum measurement apparatus.

4. The optical module according to claim 1, wherein the optical splitter comprises a semi-transparent and semi-reflective mirror.

5. The optical module according to claim 1, wherein:
   the optical splitter comprises a dichroic mirror configured to reflect visible light and transmit infrared light; and
   visible light entering from the light passing hole enters the optical imaging apparatus after being reflected by the dichroic mirror, and infrared light entering from the light passing hole enters the optical apparatus through the dichroic mirror.

6. The optical module according to claim 5, wherein:
   the optical module further comprises a lens, and the light entering from the light passing hole is incident on the optical splitter through the lens; and
   the optical imaging apparatus comprises an image sensor, and the optical apparatus comprises a time of flight (TOF) element or an infrared sensor.

7. The optical module according to claim 1, wherein:
   the optical splitter comprises a dichroic mirror configured to reflect infrared light and transmit visible light; and
   visible light entering from the light passing hole enters the optical imaging apparatus through the dichroic mirror, and infrared light entering from the light passing hole enters the optical apparatus after being reflected by the dichroic mirror.

8. The optical module according to claim 1, wherein the first image sensor is a color image sensor, and the second image sensor is a monochrome image sensor.

9. The optical module according to claim 1, wherein the optical splitter is configured to implement an optical image stabilization function.

10. The optical module according to claim 1, wherein the optical splitter is configured to adjust location, to make the first part of the light optically coupled to the optical apparatus, and the second part of the light optically coupled to the optical imaging apparatus.

11. An optical module comprising:
    structure defining a light passing hole,
    an optical splitter optically coupled to the light passing hole whereby light entering from the light passing hole is incident on the optical splitter;
    the optical splitter being configured to split the incident light into first and second parts, the first part of the light being optically coupled to an optical imaging apparatus comprising a first image sensor and a first lens, and the second part of the light being optically coupled to an optical apparatus comprising a second image sensor and a second lens,
    wherein a focal length of the first lens is different with a focal length of the second lens, wherein the first part of the light that is split by the optical splitter is transmitted to the first image sensor through the first lens, and the second part of the light that is split by the optical splitter is transmitted to the second image sensor through the second lens; wherein the first image sensor is the same as the second image sensor;
    the optical imaging apparatus being configured to collect a first image; and
    the optical apparatus being configured to obtain a second image, and/or the optical apparatus being configured to implement an optical detection function.

12. An electronic device comprising:
    an optical assembly, wherein the optical assembly comprises:
    structure defining a light passing hole,
    an optical splitter optically coupled to the light passing hole whereby light entering from the light passing hole is incident on the optical splitter;
    the optical splitter being configured to split the incident light into first and second parts, the first part of the light being optically coupled to an optical imaging apparatus comprising a first image sensor and a first lens, and the second part of the light being optically coupled to an optical apparatus comprising a second image sensor and a second lens, a focal length of the first lens is same with a focal length of the second lens, wherein the first part of the light that is split by the optical splitter is transmitted to the first image sensor through the first lens, and the second part of the light that is split by the optical splitter is transmitted to the second image sensor through the second lens, the first image sensor being different from the second image sensor;

the optical imaging apparatus being configured to collect a first image; and the optical apparatus being configured to obtain a second image, or the optical apparatus being configured to implement an optical detection function.

13. A camera comprising:

structure defining a light passing hole, an optical splitter optically coupled to the light passing hole whereby light entering from the light passing hole is incident on the optical splitter;

a first optical apparatus comprising a first image sensor and a first lens, and a second optical apparatus comprising a second image sensor and a second lens, a focal length of the first lens is different from a focal length of the second lens, wherein the optical splitter is configured to split the incident light into first and second parts, the first part of the light is optically coupled to the first optical apparatus, and the second part of the light is optically coupled to the second optical apparatus, wherein the first part of the light that is split by the optical splitter is transmitted to the first image sensor through the first lens, and the second part of the light that is split by the optical splitter is transmitted to the second image sensor through the second lens, the first image sensor being the same as the second image sensor.

14. The camera according to claim 13, wherein the first optical apparatus is configured to collect a first image, and the second optical apparatus is configured to collect a second image.

15. The camera according to claim 13, wherein the first optical apparatus is configured to collect a first image, and the second optical apparatus is configured to implement an optical detection function.

16. The camera according to claim 15, wherein the first optical apparatus comprises a image sensor, and the second optical apparatus comprises a spectrum measurement apparatus.

17. The camera according to claim 13, wherein the first optical apparatus comprises a color image sensor, and the second optical apparatus comprises a monochrome image sensor.

* * * * *